US012671263B2

(12) United States Patent
Krabbenborg

(10) Patent No.: US 12,671,263 B2
(45) Date of Patent: Jun. 30, 2026

(54) AUTONOMOUS BATTERY LIFESPAN BOOSTER

(71) Applicant: NEXPERIA B.V, Nijmegen (NL)

(72) Inventor: Bernardus Henricus Krabbenborg, Nijmegen (NL)

(73) Assignee: Nexperia B.V., Nijmegen (NL)

( * ) Notice: Subject to any disclaimer, the term of this patent is extended or adjusted under 35 U.S.C. 154(b) by 0 days.

(21) Appl. No.: 19/072,004

(22) Filed: Mar. 6, 2025

(65) Prior Publication Data

US 2025/0286396 A1      Sep. 11, 2025

(30) Foreign Application Priority Data

Mar. 7, 2024    (EP) ..................................... 24162076

(51) Int. Cl.
  H02J 7/90        (2026.01)
  H02J 7/34        (2006.01)
  H02M 3/156       (2006.01)

(52) U.S. Cl.
  CPC .............. H02J 7/933 (2026.01); H02J 7/345 (2013.01); H02M 3/156 (2013.01)

(58) Field of Classification Search
  CPC .... H02J 7/933; H02J 7/90; H02J 7/345; H02J 7/34; H02M 3/156
  See application file for complete search history.

(56) References Cited

U.S. PATENT DOCUMENTS 5,714,863 A      2/1998  Hwang et al.
2014/0266073 A1  9/2014  Keller

OTHER PUBLICATIONS

Extended European search report for corresponding European patent application EP24162076.4; 10 pages, dated Oct. 21, 2024.

*Primary Examiner* — Robert L Deberadinis
(74) *Attorney, Agent, or Firm* — Ruggiero McAllister & McMahon LLC

(57) ABSTRACT

A circuit for autonomous battery lifespan boosting, the circuit including a power source, an output, a current sensing module located on an electrical load path between the power source and the output, a direct current to direct current (DC-DC) converter, and a capacitor electronically connected to the DC-DC converter.

18 Claims, 21 Drawing Sheets

AUTONOMOUS BATTERY LIFESPAN BOOSTER

CROSS-REFERENCE TO RELATED APPLICATIONS

This application claims the benefit under 35 U.S.C. § 119(a) of European Patent Application No. 24162076.4 filed Mar. 7, 2024, the contents of which are incorporated by reference herein in their entirety.

BACKGROUND

1. Field of the Disclosure

Aspects of the present disclosure relate to a circuit, system and a method for autonomous battery lifespan boosting.

2. Description of the Related Art

The lifespan of a battery supplied application depends on the type of battery and its usage. The battery gradually deteriorates until they can no longer provide power. The deterioration is more severe for larger load currents. This is due to two factors.

The first factor is that batteries have high internal resistance which results in a voltage drop when discharged with a load current. Moreover, the internal resistance of the battery increases with the cumulative power consumed by the battery throughout its lifetime. Such internal resistance can be more than ten times higher for a battery towards the end of its life cycle compared to a fresh unused battery. The gradual increase in the internal resistance means that the voltage across a load ($V_{LOAD}$) during pulsed load currents will get progressively lower over time and eventually below a voltage value where the application will no longer function (reaching its functional end point, FEP), and the battery must be replaced.

The second factor is that the total charge that can be obtained from a battery before the voltage is reduced over time. This is dependent on the level of discharged current over the lifetime of the battery. For high pulsed discharge (i.e., pulsed load currents), the battery capacity is shown in FIG. 1. FIG. 1 shows how the internal resistance (IR) increases as the (total) consumed battery capacity increases. The closed-circuit voltage (CCV) of pulsed current and the constant background current decreases with the (total) consumed battery capacity.

Current methods for overcoming the above-mentioned factors (or problems) with high battery internal resistance and the high battery discharge current is by using a decoupling capacitor, as shown with reference symbol "C" in FIG. 2. Connecting a large decoupling capacitor in parallel to the battery will decrease the impedance (of the parallel connection) for high frequency load pulses which reduces the voltage drop and therefore reduces the battery discharge current peak. However, the capacitance of the decoupling capacitor scales with the peak load current amplitude and pulse width and so does the required space on the printed circuit board (PCB) and the costs this would bring.

A solution for preventing high battery discharge currents would be to introduce a current limiter that could be inserted between battery and the decoupling capacitor along the electrical load (in series with the battery) as shown in FIG. 3. While the current limiter would reduce the battery discharge current, the output voltage of the load ($V_{OUT}$) would drop to a level such that the system fails.

A solution for stabilizing the output voltage would be to introduce a DC-DC converter on the electrical load between the decoupling capacitor and the output as shown in FIG. 4. Naturally, this can be combined with a current limiter as mentioned above as shown in FIG. 5. While this may solve the problem of the voltage drop during high load pulses, it would still require a large decoupling capacitor to prevent high battery currents that are even higher when the voltage output is kept high, which again resulting in the capacitor taking up a large area of the circuit as well as increasing costs. Another disadvantage is that the converter is always connected in series with the battery with the associated power loss.

There is therefore a need to extend lifespan on the battery.

SUMMARY

A summary of aspects of certain examples disclosed herein is set forth below. It should be understood that these aspects are presented merely to provide the reader with a brief summary of these certain embodiments and that these aspects are not 20 intended to limit the scope of this disclosure. Indeed, this disclosure may encompass a variety of aspects and/or a combination of aspects that may not be set forth.

According to a first aspect of the present disclosure, there is provided a circuit for autonomous battery lifespan boosting, the circuit comprising a power source, an output, electrically connected to the power source, said electrical connection forming an electrical load path, a current sensing module located on said electrical load path between the power source and the output, a direct current to direct current, DC-DC, converter positioned in parallel to the current sensing module and the electrical load path and electrically connected to the electrical load path at both ends of the current sensing module, and a capacitor electronically connected to the DC-DC converter, wherein the DC-DC converter comprising an input module, electrically connected to the electrical load path between the power source and the current sensing module, configured to receive charge from the power source, an output module, electrically connected to the electrical load path between the current sensing module and the output, configured to transmit charge from the capacitor, a connection module, connected to the capacitor, a charge module, configured to connect the input module with the connection module, a buffer, configured to connect the connection module with the output module, and a controller connected to the charge module, buffer and current sensing module, wherein, in operation, the controller is configured to when a current sensed by the current sensing module is below a first threshold, instruct the charge module transfer a first charge from the input module to the connection module to charge the capacitor, when the current sensed by the current sensing module is above a first threshold, instruct the buffer to transfer a second charge from the capacitor connected to the connection module to the output module to replace the sensed current across the electrical load path until a voltage of the capacitor reaches a threshold value.

This has the advantage that the DC-DC converter can autonomously decide on when to switch from a charging mode to a discharging mode (and vice versa), as the DC-DC converter independently decides on when to start and stop the charging and discharging modes, without the need for an external circuit.

According to another aspect of the present disclosure, charge module in the DC-DC converter comprises a first inductor and at least one switch, and the buffer comprises the first inductor and at least one switch.

According to another aspect of the present disclosure, the charge module, and the buffer share at least one switch.

According to another aspect of the present disclosure, the DC-DC converter further comprises a sample and hold module configured to store a voltage from the power source.

According to another aspect of the present disclosure, the capacitor has positive polarity, where the negative capacitor voltage is positive relative to the ground.

According to another aspect of the present disclosure, the capacitor has negative polarity, where capacitor voltage is negative relative to the ground.

According to another aspect of the present disclosure, the current sensing module is a resistor.

According to another aspect of the present disclosure, a method of operation of a circuit for autonomous battery lifespan boosting, the method comprising: sensing, by a current sensing module, the current on an electrical load path between a power source and an output, wherein when the sensed current is below a first threshold value, transferring, by a controller of a direct current to direct current, DC-DC, converter, charge from the electrical load path to an input module of the DC-DC converter, transferring, by the controller and a charge module of the DC-DC converter, charge from the input module to a connection module of the DC-DC converter transferring, by the controller and the charge module, charge to a capacitor connected to the connection module, and when the sensed current is above a first threshold value, transferring, by the controller and a buffer of the DC-DC converter, charge from the capacitor to the connection module of the DC-DC converter until a voltage of the capacitor reaches a threshold value, transferring, by the controller and the buffer, charge from the connection module of the DC-DC converter to the output module of the DC-DC converter, transferring, by the controller, charge, at the sensed current level, from the output module to the electrical load path to an output.

According to another aspect of the present disclosure, wherein the transferred charge travels across a first inductor of the DC-DC converter and at least one switch of said DC-DC converter.

According to another aspect of the present disclosure, wherein the transferred charge travels across at least one shared switch.

According to another aspect of the present disclosure, the method further comprises the step of storing a voltage of the power source in a sample and hold module in the DC-DC converter.

According to another aspect of the present disclosure, wherein the current travels across the same inductor and at least one switch.

According to another embodiment of the present disclosure, wherein the charge passes through a ground of the DC-DC converter.

BRIEF DESCRIPTION OF THE DRAWINGS

So that the manner in which the features of the present disclosure can be understood in detail, a more particular description is made with reference to embodiments, some of which are illustrated in the appended figures. It is to be noted, however, that the appended figures illustrate only typical embodiments and are therefore not to be considered limiting of its scope. The figures are for facilitating an understanding of the disclosure and thus are not necessarily drawn to scale. Advantages of the subject matter claimed will become apparent to those skilled in the art upon reading this description in conjunction with the accompanying figures, in which like reference numerals have been used to designate like elements, and in which:

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the present disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single example of the present disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same example.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure. Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

In the above, and throughout the application, a pulsed load current is a periodic (i.e., repeating) electromagnetic pulse with a pre-defined amplitude and a pulse period which is longer than the time it takes to charge a capacitor.

Figure 1:
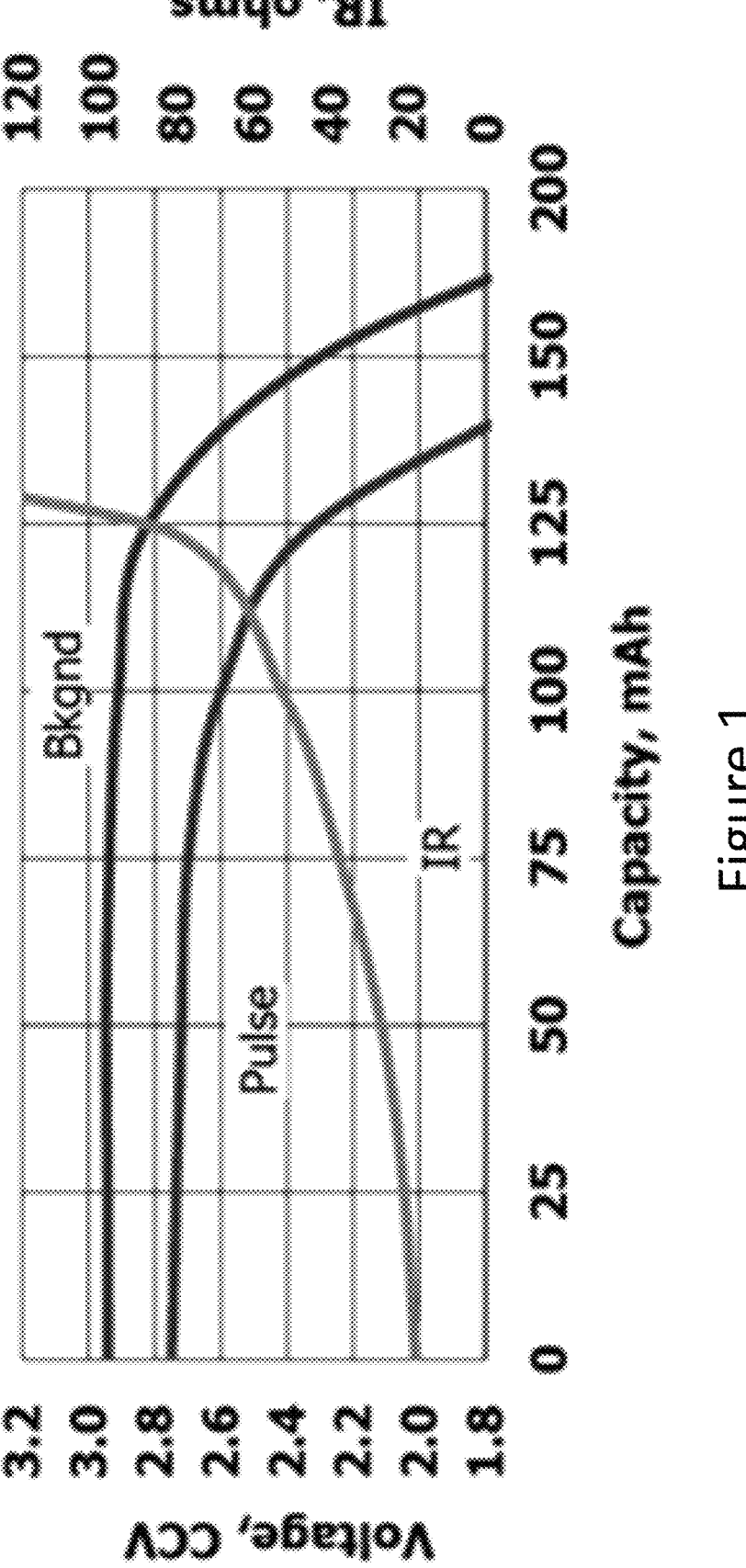
FIG. 1 shows the battery voltage and internal resistance (IR) versus consumed capacity for constant background (Bkgnd) and pulsed current (Pulse).
Figure 3:
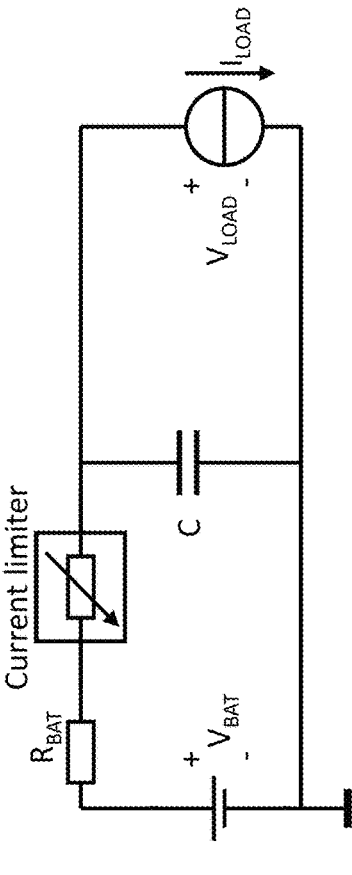
FIG. 3 shows a decoupling capacitor used to buffer the battery with a battery current limiter.
Figure 2:
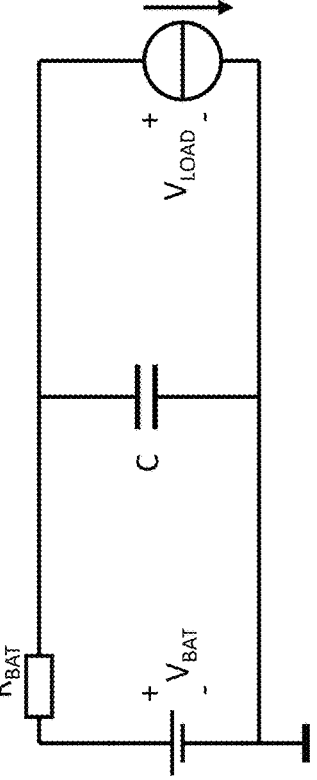
FIG. 2 shows a decoupling capacitor used to buffer the battery.
Figure 4:
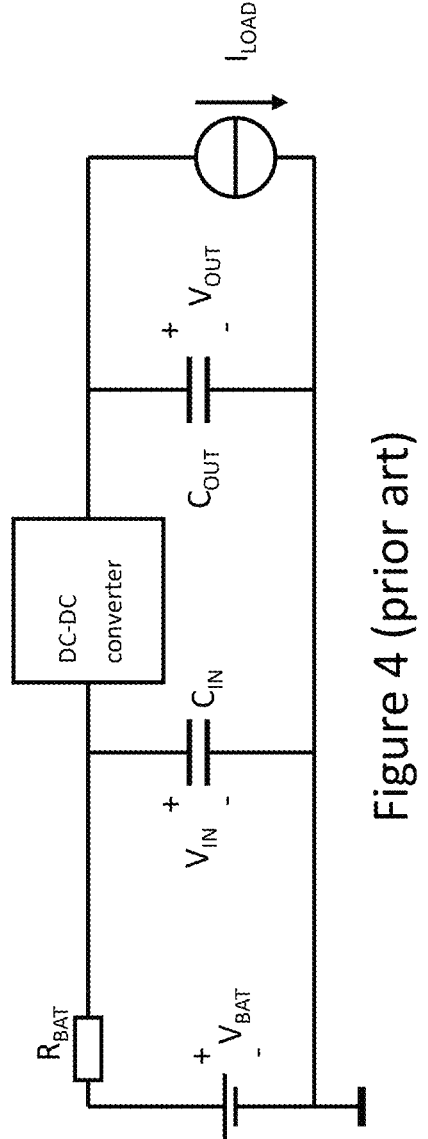
FIG. 4 shows a decoupling capacitor and a DC-DC converter used to regulate the output voltage.
Figure 5:
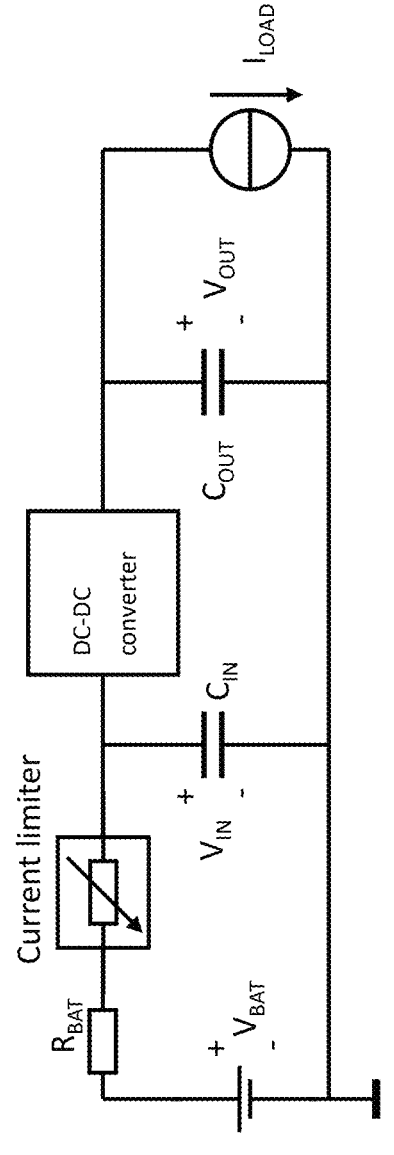
FIG. 5 shows a decoupling capacitor, current limiter and a DC-DC converter used to regulate the output voltage.
Figure 6:
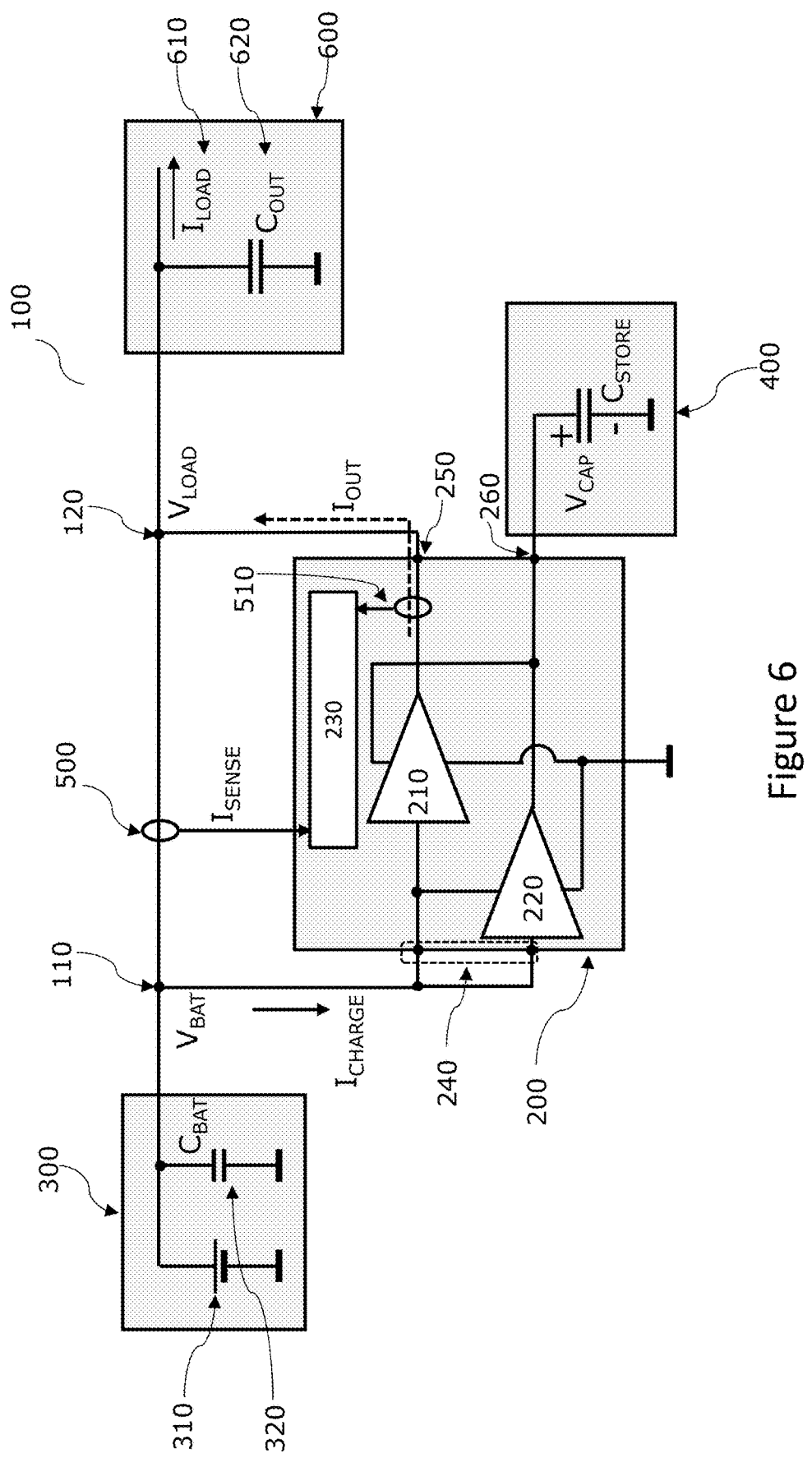
FIG. 6 shows a circuit for autonomous battery lifespan boosting according to an embodiment of the present disclosure.

FIG. 6 shows a circuit (100) for autonomous battery lifespan boosting according to an embodiment of the present disclosure. The overall circuit (100) may have at least one power source (300) in the form of, for example, a battery (310) in parallel with a capacitance C$_{BAT}$ (320). The capacitance (320) is necessary when a switching converter is used to implement the charge module. The switching direct current-to direct (DC-DC) converter pulls a high frequency discontinuous current out of the battery. The capacitance (320) is used to create a low pass filter so that the battery current is the average of the discontinuous current that is used to charge the capacitor. The power source (300) is connected to at least one output (600), indicated in FIG. 6 as the load current (610), I$_{LOAD}$, or the output capacitance (620), C$_{OUT}$. The at least one power source (300) and the at least one output (600) are electrically connected in series forming an electrical load. A current sensing device (500) may be placed on the path of the load. The electrical connection may be achieved with a conductive wire.

A DC-DC converter (200) is electrically connected at two locations (110, 120) on the load and positioned in parallel with the current sensing device (500), where the electrical connections are made at either side (or ends) of the current sensing device (500) on the load. The first connection (110) is made such that the charge from the battery is input into the DC-DC converter through an input module (240) to charge the capacitor (400). The voltage across this first connection (240) is the battery voltage, V$_{BAT}$, (110) with a battery discharge current I$_{CHARGE}$. The second connection (120) is made such that the charge from the capacitor (400) is output to the load through the DC-DC converter (250). The voltage across this second connection is the load voltage, V$_{LOAD}$, (120) with an output current I$_{OUT}$.

By placing the DC-DC converter (200) parallel to the electrical load path between the battery (300) and the output (600), it is possible to reduce the overall power consumption of the circuit (100) as the DC-DC converter (200) can be switched off for low load whilst allowing the load to still flow between the battery (300) and the output (600).

The DC-DC converter (200) comprises a controller (230) which is electrically connected with the current sensing device (500) on the load. The current sensing device (500) senses the current, I$_{SENSE}$, across said current sensing device (R$_{SENSE}$, 500).

The DC-DC converter (200) also comprises a connection module (260), where said DC-DC converter (200) is connected to a storage capacitor (400) with capacitance C$_{STORE}$ and voltage V$_{CAP}$.

The DC-DC converter (200) of FIG. 6 further comprises a buffer module (210), and a charge module (220). The charge module (220), which forms an electrical connection between the input module (240) and the connection module (260), is configured to transfer charge from the input module (240) to the connection module (260). The buffer module (210), which forms an electrical connection between the connection module (260) and the output module (250), is configured to transfer charge from the capacitor (400) to the load (600).

The controller (or controller module) of the DC-DC converter (200) is further configured to monitor and control the output current (I$_{OUT}$) of the buffer module (210) and to deliver it to the load. When I$_{OUT}$ is below a threshold, I$_{STOP}$, the controller (230) is configured to instruct the buffer module (210) to stop transmitting current to the load and to instruct the charge module (220) to start (re) charging the capacitor $C_{STORE}$ (400). The controller (230) is also configured to instruct the charge module (220) to stop charging when the capacitor (400) is charged to a maximum voltage level $V_{CAP,MAX}$. Furthermore, the controller module (230) and the current sensing module (500) may be manufactured as one module but could also be separate modules.

While not shown in FIG. 6, the controller (230) is also connected to the ground, the battery voltage $V_{BAT}$ and output voltage $V_{LOAD}$.

As it will be described later, the present disclosure uses energy storage in the capacitor $C_{STORE}$ (400) at a voltage level much higher than the (sampled) battery voltage $V_{BAT}$. The capacitor (400) is charged using a constant, low current from the battery (300) using the DC-DC converter (200) attached in parallel to the load current. The magnitude of this current is so low that it is able to extend the lifespan of a battery (300) by reducing the rate at which the voltage drops per pulse cycle, as well as reducing the rate at which internal resistance builds up in the battery (300).

The DC-DC converter (200) employs two modes of operation: a charging mode and a discharging mode which are described below.

Charging Mode

Figure 7:
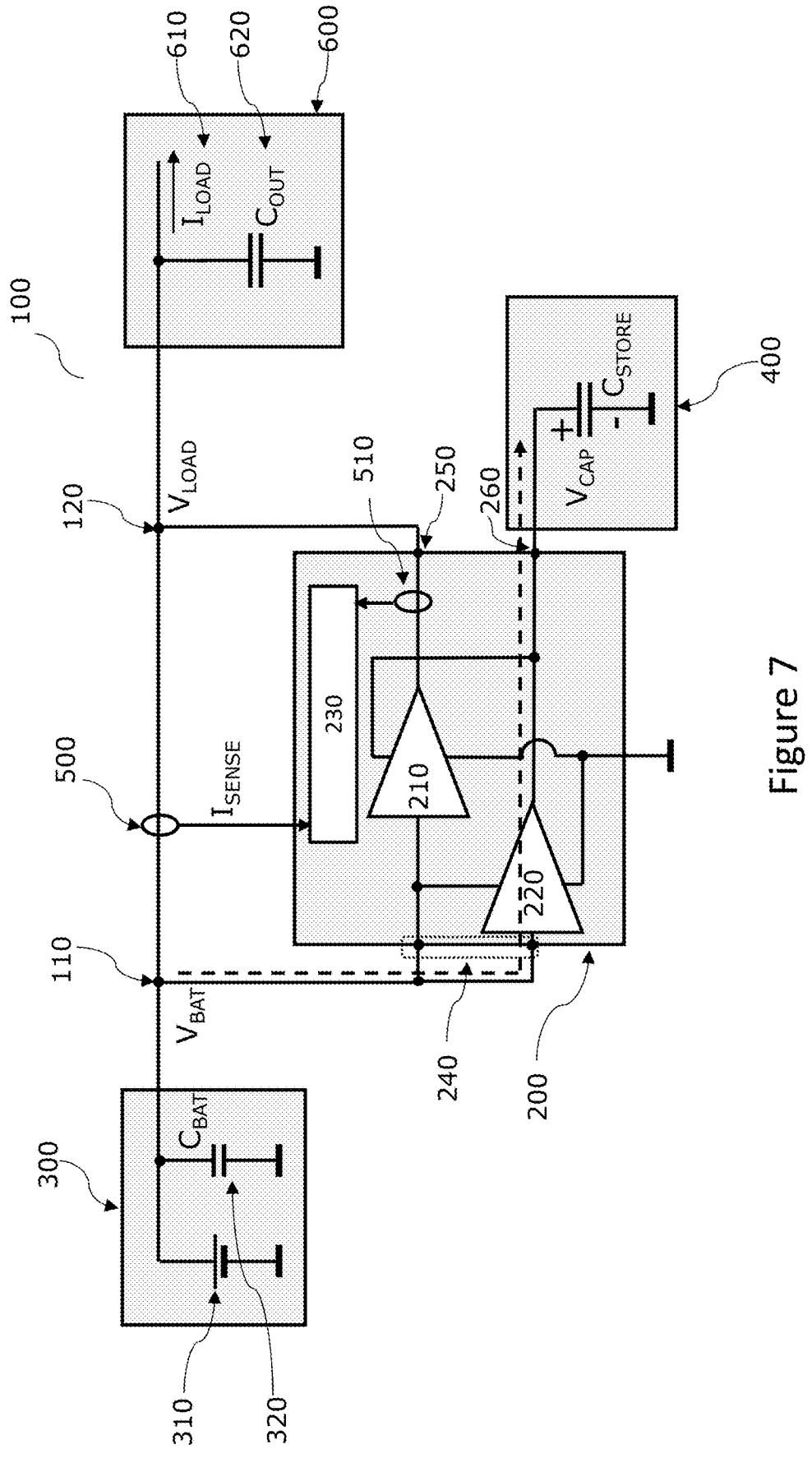
FIG. 7 shows the current path during a charging mode for the circuit described in FIG. 6 according to an embodiment of the present disclosure.

FIG. 7 shows the charging mode performed by the circuit according to an embodiment of the present disclosure. The charging mode refers to the battery charging the capacitor.

The controller (230) monitors and measures the unloaded (sampled) battery voltage and the current from the battery (310) to the load current $I_{SENSE}$ at the current sensing module (500). When $I_{SENSE}$ (through $R_{SENSE}$ if the current sensing module is a resistor) is below a first threshold, $I_{START}$, the controller is configured to instruct the charge module (220) to charge the storage capacitor $C_{STORE}$ (400) to be ready for the (next) high load pulse. The path of the current through the DC-DC converter (200) is illustrated in FIG. 7 along the dashed line. In this mode, the battery charge is transferred to the capacitance (400) with a current $I_{CHARGE}$ through the DC-DC converter (200) until the capacitor (400) is charged to a maximum voltage level $V_{CAP,MAX}$. Once this maximum voltage level is reached (or when the circuit (100) enters discharging mode described below), the controller (230) instructs the charge module (220) to stop charging the storage capacitor (400).

Discharging Mode

Figure 8:
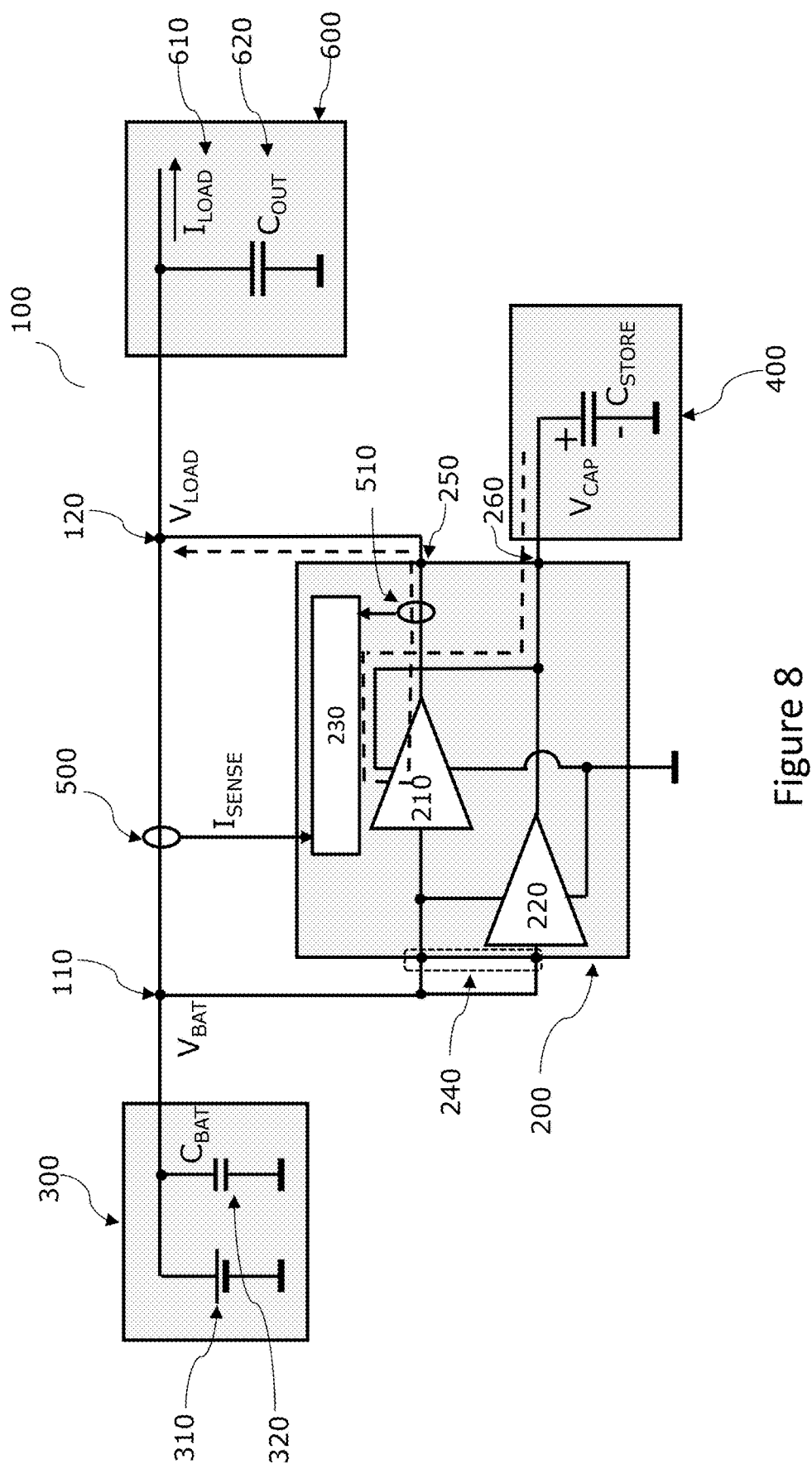
FIG. 8 shows the current path during a discharging mode (buffering mode) for the circuit described in FIGS. 6 and 7 according to an embodiment of the present disclosure.

FIG. 8 shows the discharging mode performed by the circuit (100) according to an embodiment of the present disclosure. The discharging mode refers to the capacitor (400) supplying the charge to the load instead of the battery (310).

The controller (230) monitors and measures the unloaded (sampled) battery voltage and the current from the battery (310) to the load current $I_{SENSE}$ at the current sensing module (500). When $I_{SENSE}$ (through $R_{SENSE}$ if the current sensing module (500) is a resistor) is above a first threshold, $I_{START}$, the controller (230) is configured to activate and instruct the buffer module (210) to supply current from $C_{STORE}$ (400) to the load using the DC-DC converter (200) with an output voltage $V_{LOAD}$ (120) regulated to the unloaded (sampled) battery voltage at current $I_{OUT}$. This process is also known as buffering. The path of the current through the DC-DC converter (200) is illustrated in FIG. 8 along the dashed line. This results in the battery (310) (or power source 300) no longer discharging and contributing to the load current, $I_{LOAD}$, (610) which is entirely (or predominantly) delivered by the storage capacitor (400) connected to the DC-DC converter (200). In other words, $V_{LOAD}$ (120) is regulated to $V_{BAT}$ (110) (i.e., $V_{LOAD}=V_{BAT}$). In other words, $I_{SENSE}$ is regulated to zero so almost no current is pulled from the battery (310) (i.e., $I_{LOAD}=I_{OUT}$).

The controller (200) is also configured to monitor the output current $I_{OUT}$ of the buffer (210) delivered to the load. When $I_{OUT}$ is below a second threshold, $I_{STOP}$, the controller (230) will stop the buffer (210) and will enter the charging mode described above.

Figure 9:
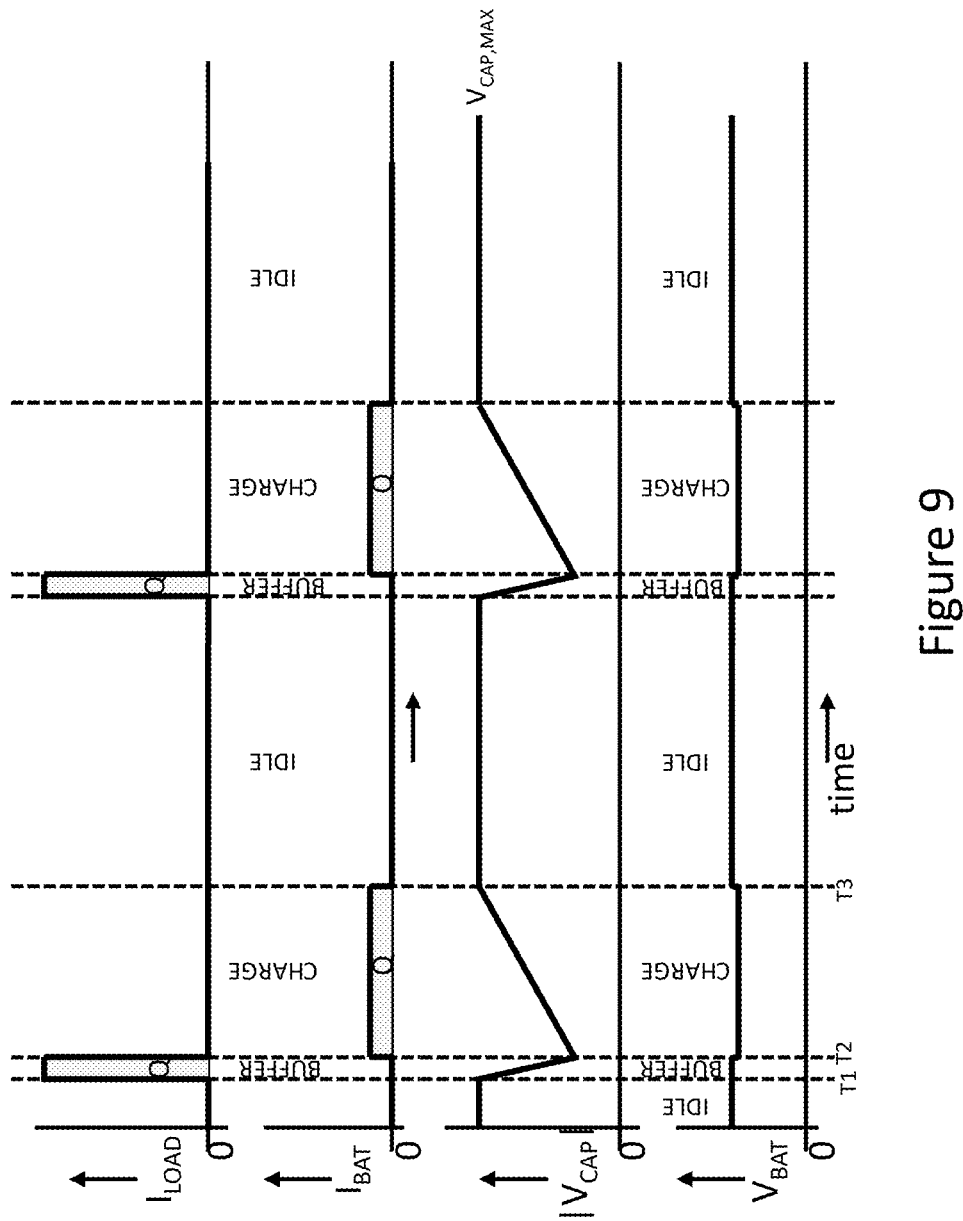
FIG. 9 shows a periodic pulsed load current, battery current and capacitor voltage over time during charging mode and discharging mode according to an embodiment of the present disclosure.

FIG. 9 shows the timing of the load current $I_{LOAD}$, the capacitor voltage $V_{CAP}$ and the battery (310) (power source 300) current $I_{BAT}$. Initially, the DC-DC converter (200) is idle, and the battery (310) is supplying the load with current $I_{LOAD}$ through the current sensing module (500) with $R_{SENSE}$. Here, an idle DC-DC converter (200) means that $I_{LOAD}$ is less than a threshold value, $I_{START}$. At time T1 the current $I_{SENSE}$ through $R_{SENSE}$ is above the threshold $I_{START}$, and the controller (230) is configured to activate (or instruct) the buffer (210) and the full load current $I_{LOAD}$ will be supplied by the buffer (210) current $I_{OUT}$. In this situation $V_{LOAD}$ (120) is regulated to the (sampled) battery voltage $V_{BAT}$ (110) so that almost no current is pulled from the battery (310), and there are no discernable changes in $V_{BAT}$ (i.e., no voltage drop) during the buffering process when the current from the capacitor (predominantly or fully) replaces the current supplied by the battery to the load. The capacitor voltage, $V_{CAP}$, decreases as the capacitor (400) is now supplying current $I_{LOAD}$ with charge Q held in the capacitor (400). This controller (230) monitors $I_{OUT}$ and as soon as $I_{OUT}$ is below $I_{STOP}$, the buffer (210) is disabled at time T2 and the charge circuit (220) is enabled to recharge $C_{STORE}$ (400) with charge Q to a voltage $V_{CAP,MAX}$ from time T2 to T3. Once the charging process is complete, the DC-DC converter (200) returns to idle. Hysteresis is used to prevent oscillating by defining $I_{STOP}<I_{START}$.

The advantage of charging the capacitor (400) to a voltage higher than the (sampled) battery voltage is that the amount of energy stored in the capacitor (400) scales as the square of the voltage. Charging up to 4 times the battery voltage stores 16 times more energy than using the same capacitor for battery decoupling.

The advantage of discharging the battery (310) only between the load current pulses to charge the storage capacitor is that maximal battery capacitor is obtained, and no voltage drop occurs during the load pulses, so that maximum battery lifetime is reached. For a given load current profile this method gives the best possible battery discharge current profile.

If the storage capacitor is not fully charged before the circuit enters the discharging mode (i.e., not charged to $V_{CAP,MAX}$), the charging mode may be interrupted and resumed after the load current pulse is delivered. This results in insufficient charge being drawn from the capacitor as it is not fully charged. In order to prevent this, the storage capacitor may also have a minimum voltage level, $V_{CAP,MIN}$, such that the controller is configured to discharge the capacitor from $V_{CAP,MAX}$ to $V_{CAP,MIN}$ (and not 0) during discharging mode to prevent exhaustion of the charge in the capacitor.

Returning to FIG. 6, the DC-DC converter (200) may also include a second current sensing module (510) configured to sense the output current ($I_{OUT}$) and may be configured to end the discharge (buffer) phase when the output current falls below a threshold value. This allows the circuit (100) to autonomously switch between charging and discharging modes, and the circuit (100) is able to determine the timing of switching to the charging and discharging modes. This means that the circuit does not need any additional circuitry, such as I²C/SPI buses, to perform these functions. Hereafter, the different configurations of the DC-DC converter is disclosed.

Variation 1: Non-Inverting DC-DC Converter

Figure 10:
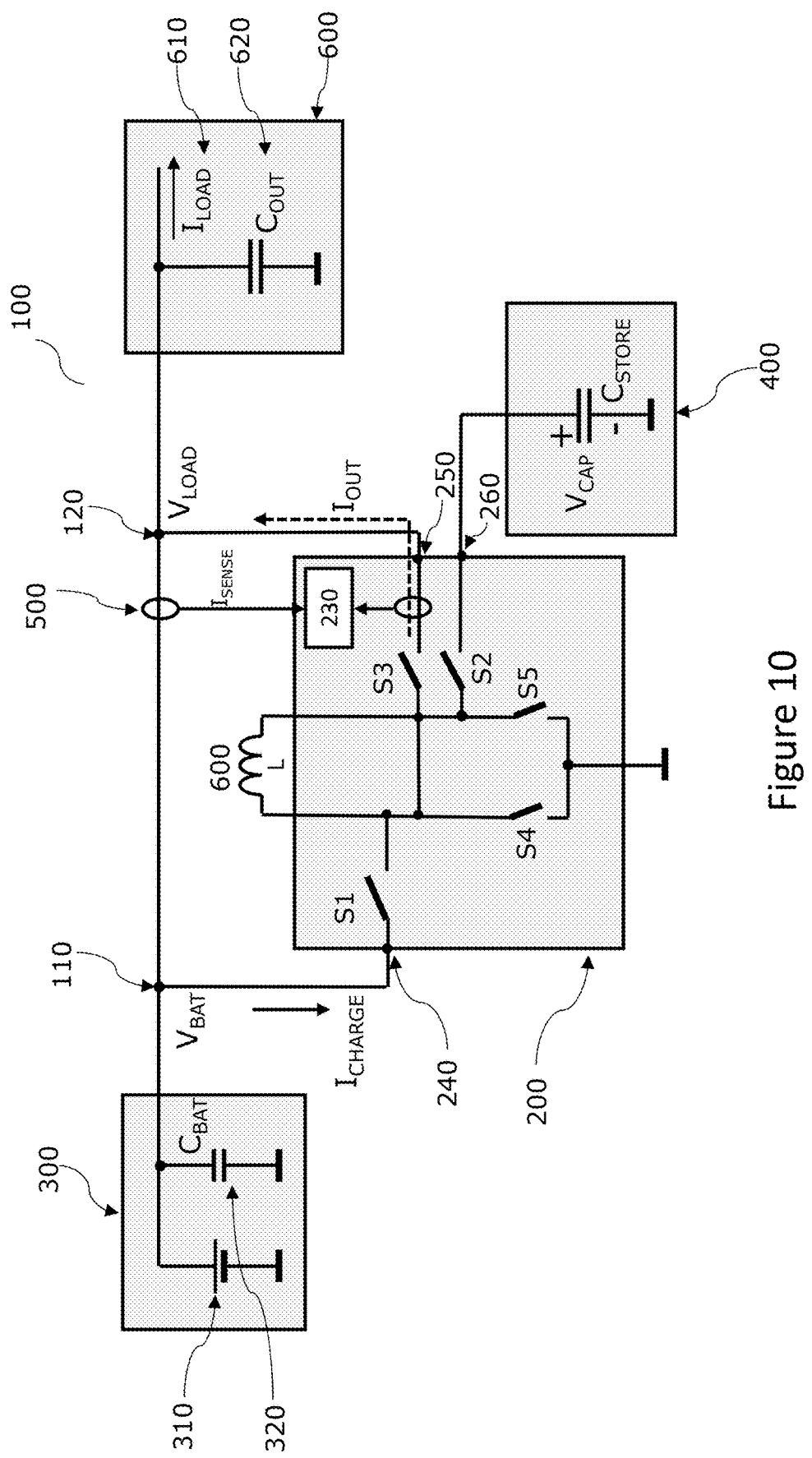
FIG. 10 shows a circuit for autonomous battery lifespan boosting according to another embodiment of the present disclosure.

FIG. 10 shows a circuit (100) for autonomous battery lifespan boosting according to an embodiment of the present disclosure. In this embodiment, the DC-DC converter (100) is implemented as a non-inverting (inductive) DC-DC converter which comprises an inductor L (600) and switches S1-S5 where the inductor (600) and the switches function as the buffer (210) and charge (220) modules. In this variation, the charge module (220) is a combination of the inductor (600) and switches S1, S2, S4 and S5, and the buffer module (210) is a combination of the inductor (600) and switches S2, S3, S4 and S5. The input module (240) of the DC-DC converter (200) is connected to switch S1, the output module (250) of the DC-DC converter (200) is connected to switch S3, and the connector module (260) of the DC-DC converter (200) is connected to switch S2. The remaining aspects of the circuit (100) are identical to those described in the embodiments above and FIGS. 6-8 and is therefore not discussed here for sake of brevity.

It Is understood that non-inverting refers to a positive polarity of the capacitance voltage $V_{CAP}$, meaning that the capacitor (400) has a positive capacitor voltage relative to the ground.

During the charging mode, the battery discharge current $I_{BAT}$ (as $I_{CHARGE}$) IS regulated to a predefined value by the controller (230). This is done by controlling the DC-DC converter (200) in a discontinuous buck-boost mode as described below. While the disclosure below is described for a discontinuous buck-boost mode, other modal variations exist. These other modes are well known in the art and the skilled person will understand the differences between these modes.

The charging mode occurs In three phases that repeat with a switching frequency $f_S$. The charge current equal to the time averaged current from battery to inductor during the three phases of each switching period. During the charging mode, the battery (310) is discharging with the (low) load current $I_{LOAD}$ to the load and the charging current $I_{CHARGE}$ from battery (310) to capacitor (400) through the DC-DC converter (200).

FIGS. 11a-11d described below, disclose the current passing through the DC-DC converter (200) during charging and discharging modes using circuitry identical to FIG. 10.

Figures 11A, 11B:
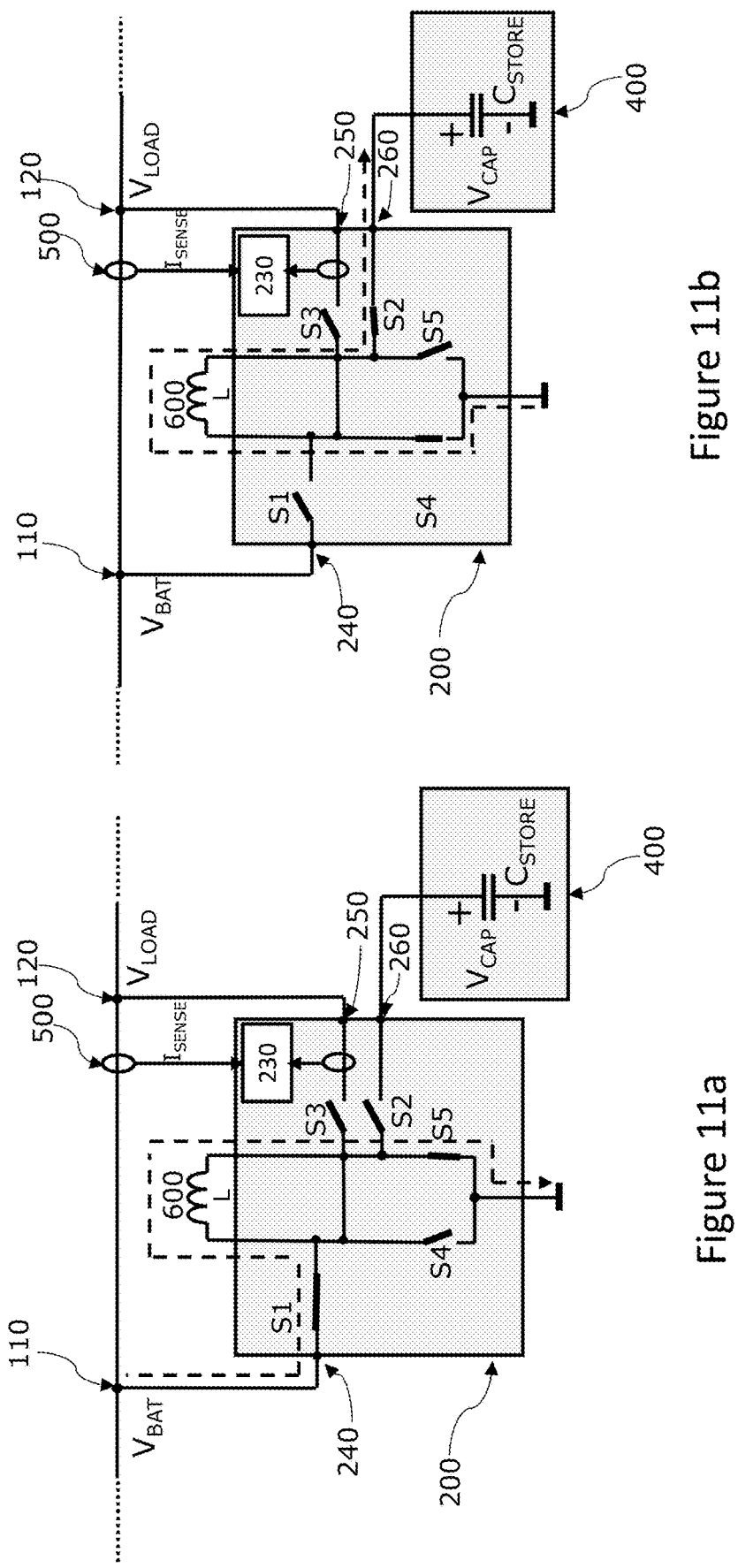
FIGS. 11a-d shows the current path during a charging mode (FIG. 11a depicting phase 1 of the charging mode, FIG. 11b depicting phase 2 of the charging mode) and discharging mode (FIG. 11c depicting phase 1 of the discharging mode, FIG. 11d depicting phase 2 of the discharging mode) of the circuit described in FIG. 10 according to an embodiment of the present disclosure.

FIG. 11a shows phase 1 of the charging mode, where switches S1 and S5 in the DC-DC converter (200) are closed so that the current flows from the input module of the DC-DC converter (200) to the inductor L (500). This allows the current flowing through the inductor (600), $I_L$, to ground to linearly increase.

FIG. 11b shows phase 2 of the charging mode, where switches S1 and S5 in the DC-DC converter (200) are opened and switches S2 and S4 are closed. The inductor current $I_L$ that was built up in phase 1 of the charging mode now flows from the ground to the storage capacitor (400) and charges this capacitor $C_{STORE}$ (400). The current $I_L$ running through the inductor L (600) from ground to $C_{STORE}$ (400) will get progressively smaller over time until it becomes zero.

In phase 3 of the charging mode, switches S2 and S4 are opened such that all of the switches are open, and the switch (S1-S5) configuration reverts to what is shown in FIG. 10. The inductor (600) current stays zero, and the circuit (100) does nothing until phase 1 of the charging mode is re-started. The length of phase 3 depends on the capacitor voltage $V_{CAP}$, the (sampled) battery voltage $V_{BAT}$, the switching frequency $f_S$, the length of phase 1 of the charging mode and the inductor value L. When all parameters are chosen appropriately, the length of phase 3 of the charging phase is always above zero and the charge current is independent of the capacitor voltage and only depends on $f_S$, $V_{BAT}$, L and the length of phase 1 of the charging mode.

During the discharge mode, the output voltage is regulated to the unloaded (sampled) battery voltage by regulating the voltage across the current sensing module (500) $R_{SENSE}$ to 0. Regulation of the DC-DC converter (200) is done by controlling the timing of the switches (S1-S5) using various methods that are well known in the art as buck, boost and buck-boost control. Each of these methods can be operated in both continuous conduction mode (CCM) that uses two phases as well as in discontinuous conduction mode (DCM) that also uses a third (idle) phase.

The buck mode can only be used when the capacitor voltage is higher than the load voltage. The boost mode can only be used when the capacitor voltage is lower than the load voltage. The buck-boost mode can be used when the capacitor voltage is below or above the load voltage.

As an example, the buck-boost mode is described here that allows capacitor voltages both higher as wells as lower than the load voltage. The discharging mode also occurs in three phases where the length of phase 3 of the discharging mode depends on the load current and can be 0 for high load currents (CCM) or non-zero for low load currents (DCM). During phase 1 of the discharge mode, the storage capacitor (400) is discharging to provide the load current, and the battery current is close to (if not equal to) zero.

Figures 11C, 11D:
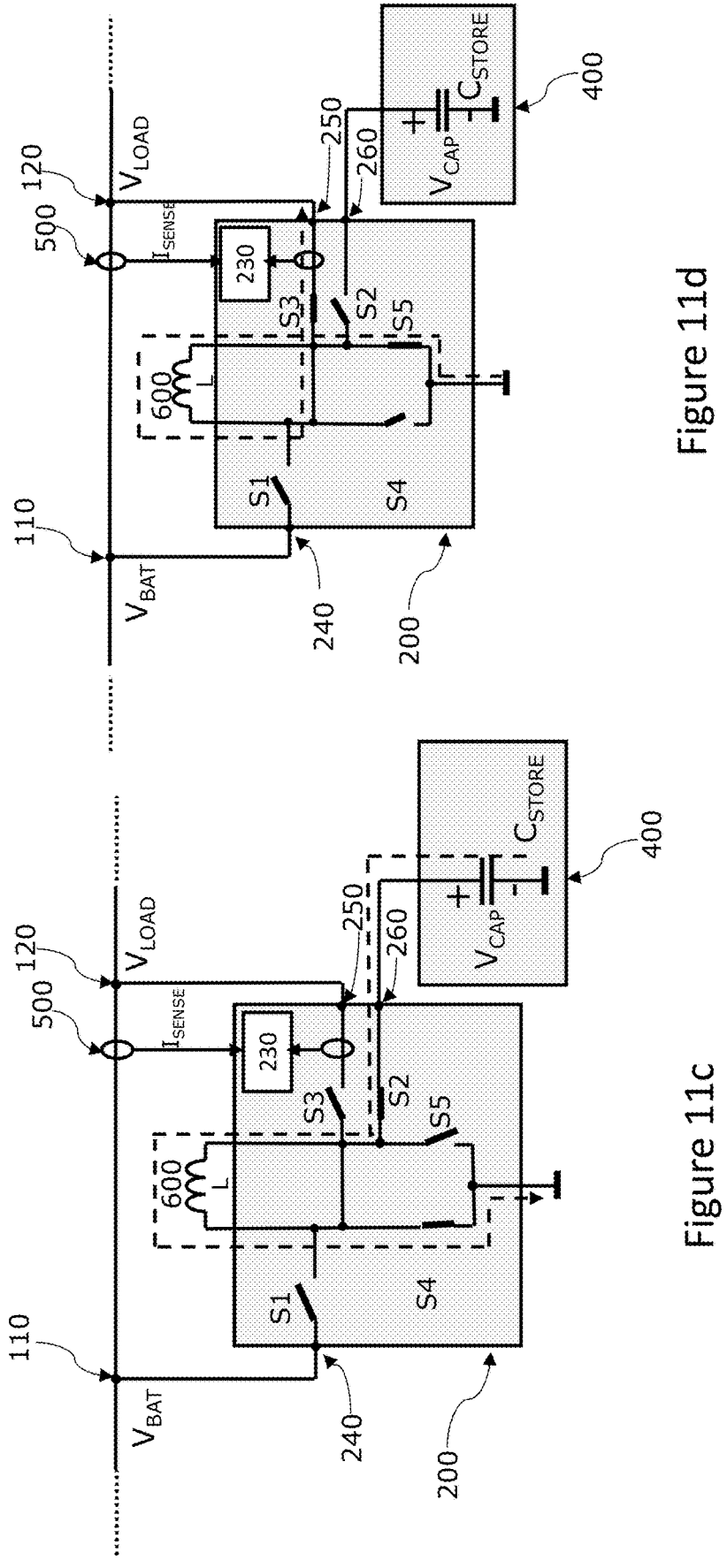

FIG. 11c shows phase 1 of the discharging mode, where switches S2, and S4 are closed and the current $I_L$ flows from $C_{STORE}$ (400) to ground through the inductor (600) and will linearly increase.

FIG. 11d shows phase 2 of the discharging mode, where switches S2 and S4 are opened and switches S3 and S5 are closed so that the current $I_L$ through the inductor L (600) flows from ground to the load and will linearly decrease. Phase 2 of the discharging mode ends when the next switching period starts a new phase 1 of the discharging mode (for CCM), or when $I_L$ has reached approximately zero (for DCM) and phase 3 of the discharging mode commences. During phase 2 of the discharging mode, the storage capacitor (400) is not discharging but the load current is still provided by the inductor (600) and the output capacitor $C_{OUT}$ and the battery current is still close to (if not equal to) zero.

In phase 3 of the discharging mode, all switches (S1-S5) are opened and the switch (S1-S5) configuration reverts to what is shown in FIG. 10 and the circuit (100) may idle until the next switching cycle starts.

Variation 2: Inverting DC-DC Converter

Figure 12:
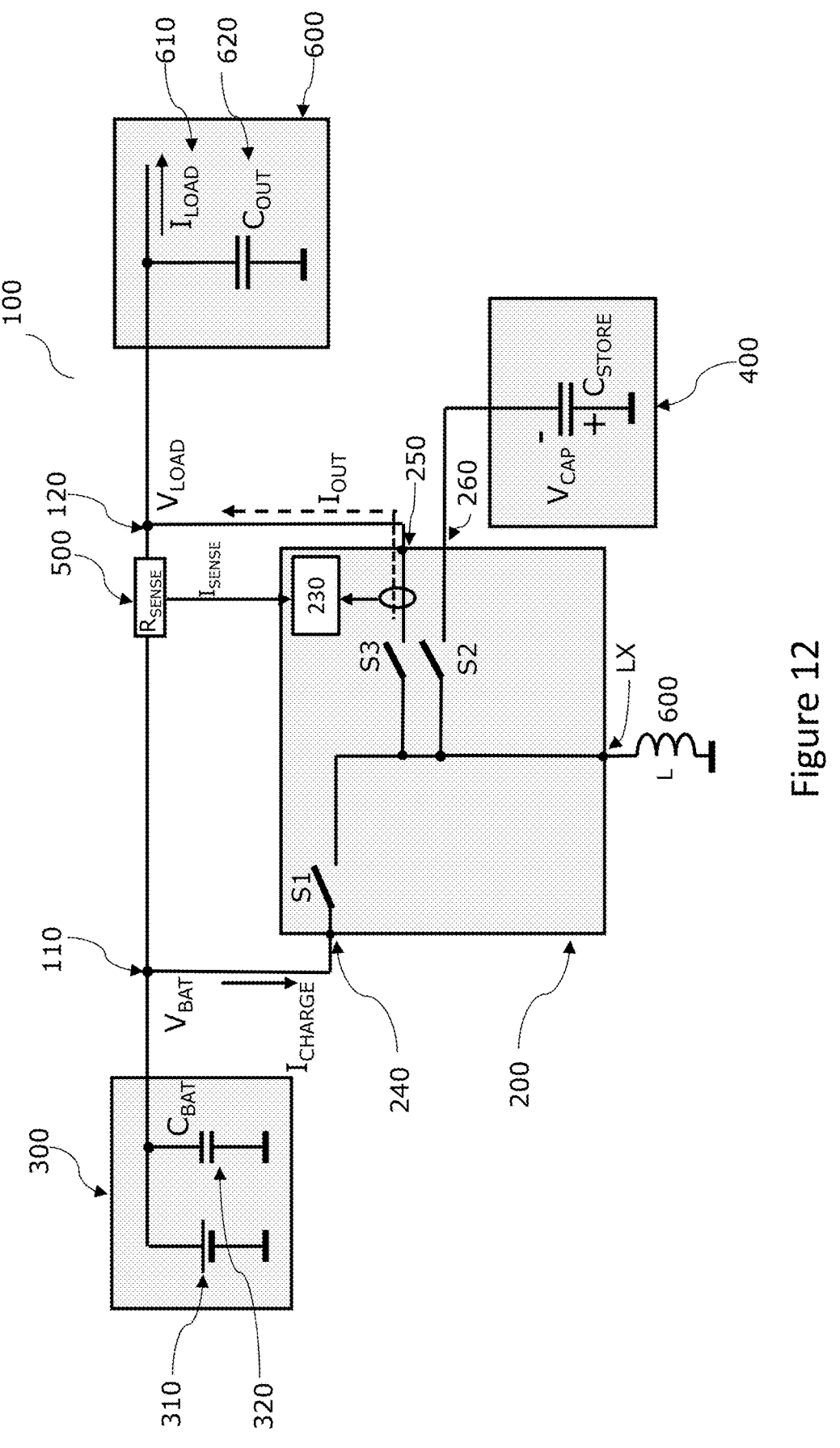
FIG. 12 shows a circuit for autonomous battery lifespan boosting according to another embodiment of the present disclosure.

FIG. 12 shows a circuit for autonomous battery lifespan boosting according to another embodiment of the present disclosure. In this embodiment, the DC-DC converter (200) is implemented as an inverting (inductive) DC-DC converter which comprises an inductor L (600) (connected to the DC-DC converter (200) at connection point LX) and switches S1-S3 where the inductor (600) and the switches function as the buffer (210) and charge (220) modules. In this variation, the charge module (220) is a combination of the inductor (600) and switches S1 and S2, and the buffer module (210) is a combination of the inductor (600) and switches S2 and S3. The input module (240) of the DC-DC converter (200) is connected to switch S1, the output module (250) of the DC-DC converter (200) is connected to switch S3, and the connector module (260) of the DC-DC converter (200) is connected to switch S2. The remaining aspects of the circuit are identical to those described in the embodiments above and FIGS. 6-8 and 10-11 and is therefore not discussed here for sake of brevity. It is understood that inverting refers to a negative (or reverse) polarity of the capacitance voltage $V_{CAP}$, meaning that the capacitor (400) has a negative capacitor voltage relative to the ground. The negative polarity has the benefit that it reduces the number of switches in the DC-DC converter. An additional benefit is that one side of the inductor is directly connected to ground and the DC-DC converter needs two pins less to connect it.

FIGS. 13a-13d described below, disclose the current passing through the DC-DC converter (200) during charging and discharging modes using circuitry identical to FIG. 12.

Figures 13A, 13B:
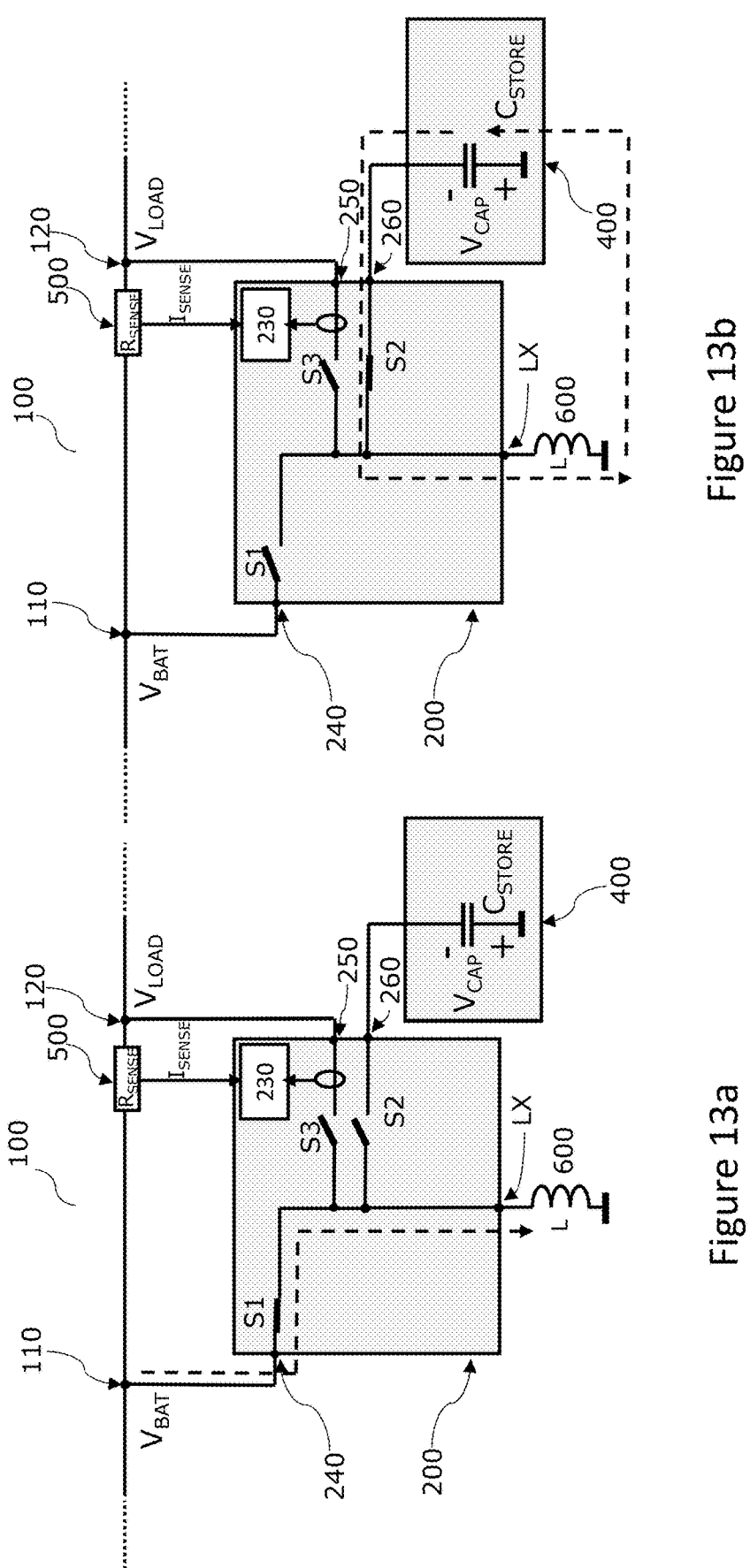
FIG. 13a-d shows the current path during a charging mode (FIG. 13a depicting phase 1 of the charging mode, FIG. 13b depicting phase 2 of the charging mode) and discharging mode (FIG. 13c depicting phase 1 of the discharging mode, FIG. 13d depicting phase 2 of the discharging mode) of the circuit described in FIG. 12 according to an embodiment of the present disclosure.

FIG. 13a shows phase 1 of the charging mode where only switch S1 is closed (switches S2 and S3 are open), and the current travels from the input module (240) through the inductor to ground via connection LX in the DC-DC converter (200).

FIG. 13b shows phase 2 of the charging mode where switch S1 is opened and switch S2 is closed so that the current travels from the ground through the capacitor (400) connected to the connection module (260) of the DC-DC converter (200) through the inductor (600) back to ground. The current path is indicated as a dashed line in FIG. 13b, as well as the current path for charging the capacitor (400) using this phase. In phase 3 all switches S1-S3 are opened, and the switch (S1-S3) configuration reverts to what is shown in FIG. 12.

Figures 13C, 13D:
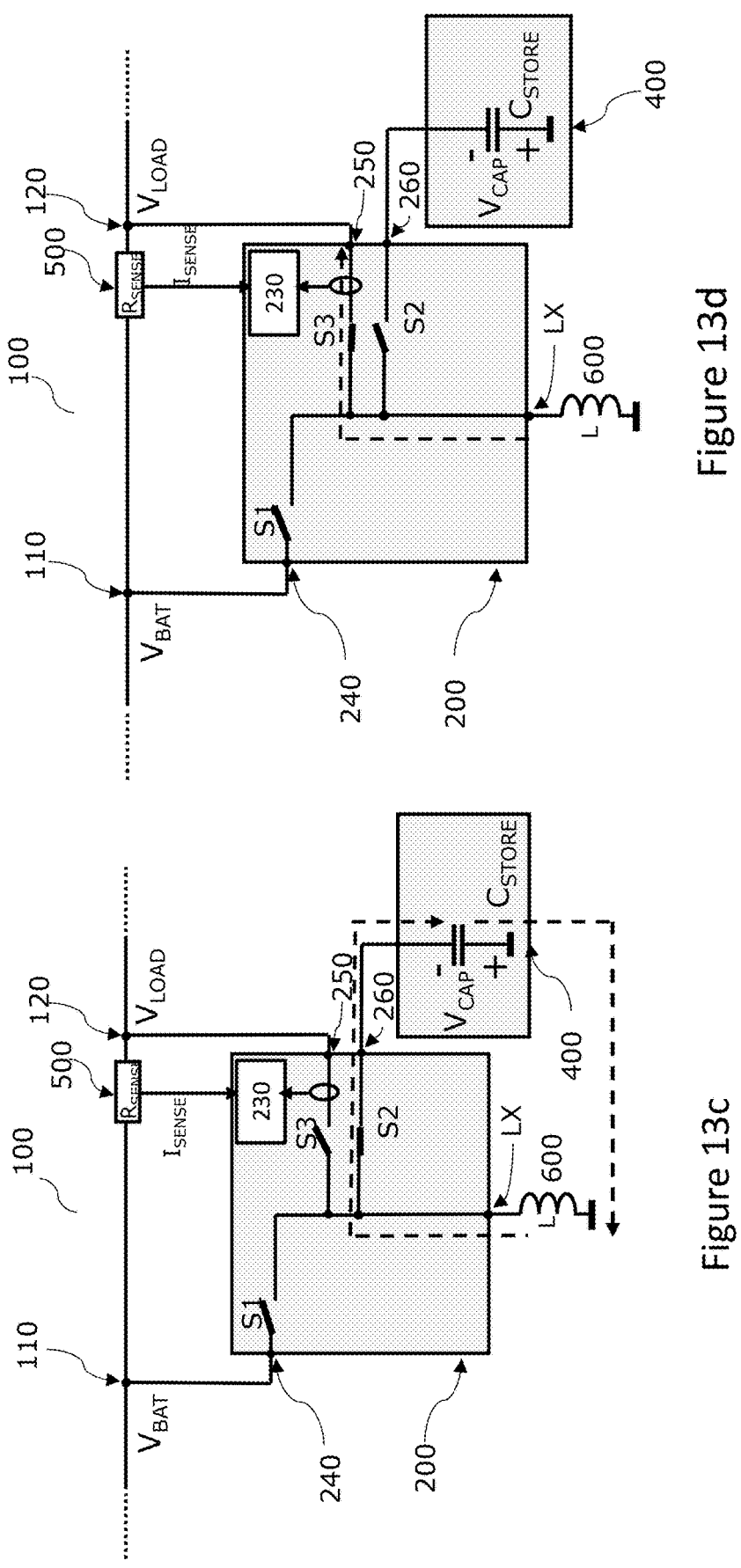

FIG. 13c shows phase 1 of the discharging mode where switch S2 is closed and the current travels from the capacitor to ground through the inductor back to the capacitor.

FIG. 13d shows phase 2 of the discharging mode where switch S2 is opened and switch S3 is closed so that the current travels from ground through the inductor (600) to the load through the output module (250) of the DC-DC converter (200). In phase 3 all switches are opened, and the switch (S1-S3) configuration reverts to what is shown in FIG. 12.

Instead of connecting the inductor (600) to an external ground, a connection through the DC-DC converter (200) can be made. Since the inductor current always flows to ground, this allows an easy implementation of current sense circuits referenced to ground.

This inverting DC-DC converter (200) has a few advantages compared to the non-inverting DC-DC converter (200) of Variation 1 described above. Only three switches (S1-S3) are required to perform the DC-DC conversion because one side of the inductor (600) is permanently connected to the ground. This reduces the complexity of the system and lowers the cost. For an integrated DC-DC converter (200), this results in either a smaller die size (lower cost) or a lower power loss (higher power efficiency) when the same area is used for fewer switches. Switch S2 and the inductor (600) are now time shared between the charging mode and discharging mode (buffering phase). Only one inductor (600) connection is switching between battery voltage, capacitor voltage and output voltage. This is an advantage for electromagnetic coupling (EMC) behavior in printed circuit board (PCB) design. As one terminal of the inductor is always connected to ground, all inductor current measurements required for charge and discharge modes can be done in a single ground connection instead of measuring currents through different switches. This allows a much easier implementation using a single measurement circuit relative to ground that can provide all information required for peak current detections, zero current, and so on.

Variation 3: Inverting DC-DC Converter

Figure 14:
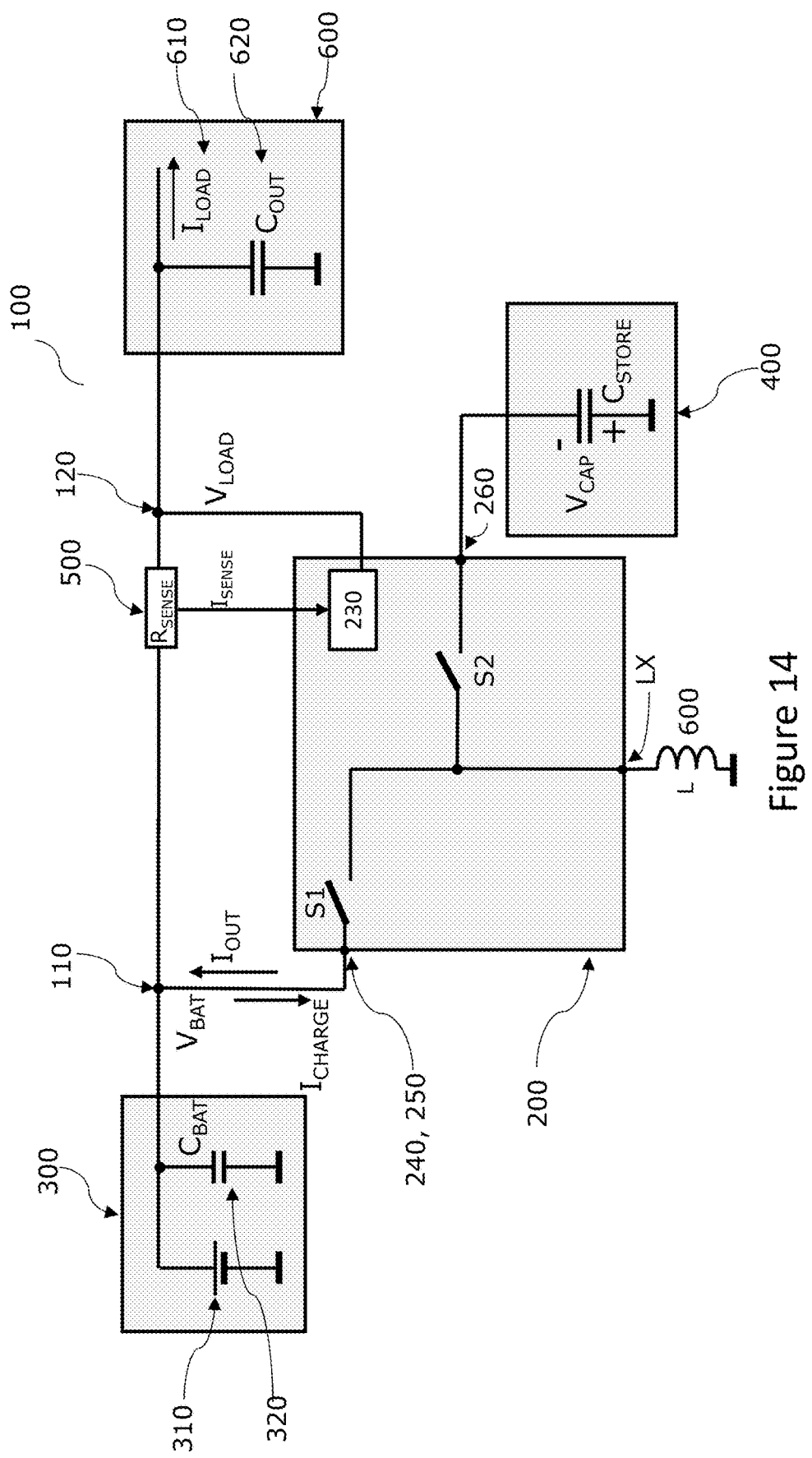
FIG. 14 shows a circuit for autonomous battery lifespan boosting according to another embodiment of the present disclosure.

FIG. 14 shows a circuit (100) for autonomous battery lifespan boosting according to another embodiment of the present disclosure. In this embodiment, the DC-DC converter (200) is implemented as an inverting (inductive) DC-DC converter (200) that allows power flow in both directions. The DC-DC converter (200) comprises an inductor L (600, connected to the DC-DC converter (200) at connection point LX) and switches S1 and S2 where the inductor (600) and the switches (S1, S2) function as both the buffer (210) and charge (220) modules. In this variation, both the charge module (220) and the buffer module (210) are a combination of the same inductor (600) and switch S1 and switch S2. The difference between charging and discharging modes of operation is implemented in different timing and control of the switches (S1, S2). The input module (240) of the DC-DC converter (200) is connected to switch S1, the output module (250) of the DC-DC converter shares the same circuitry as the input module (240) (i.e., also connected to switch S1), and the connector module (260) of the DC-DC converter (200) is connected to switch S2. The remaining aspects of the circuit are identical to those described in the embodiments above and FIGS. 6-8 and 11-13. It is understood that inverting refers to a negative (or reverse) polarity of the capacitance voltage $V_{CAP}$, meaning that the capacitor (400) has a negative capacitor voltage relative to the ground.

FIGS. 15a-15d described below, disclose the current passing through the DC-DC converter (200) during charging and discharging modes using circuitry identical to FIG. 14.

Figures 15A, 15B:
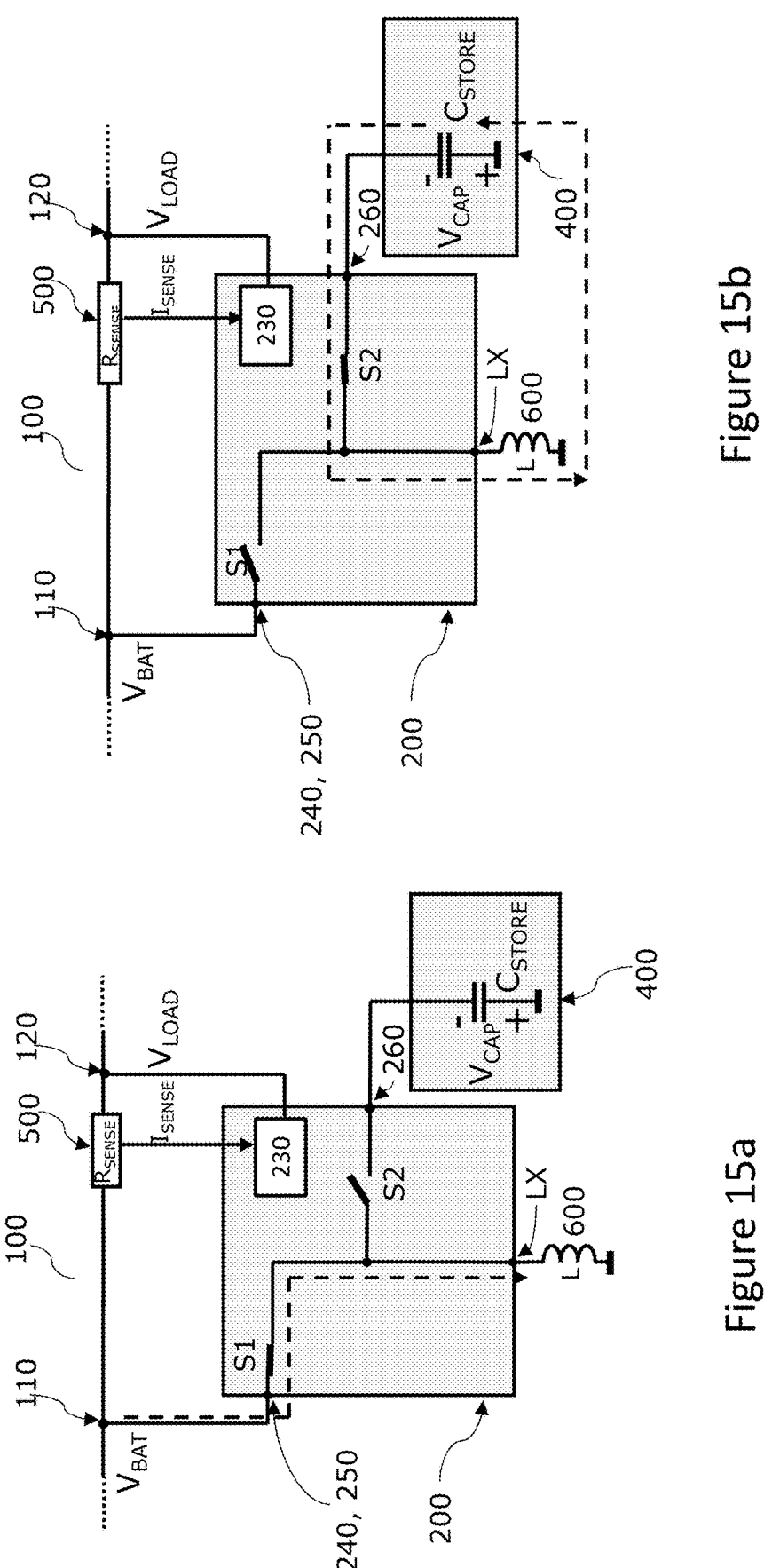
FIG. 15a-d shows the current path during a charging mode (FIG. 15a depicting phase 1 of the charging mode, FIG. 15b depicting phase 2 of the charging mode) and discharging mode (FIG. 15c depicting phase 1 of the discharging mode, FIG. 15d depicting phase 2 of the discharging mode) of the circuit described in FIG. 12 according to an embodiment of the present disclosure.

FIG. 15a shows phase 1 of the charging mode where switch S1 is closed (switch S2 is open), and the current travels from the input module (240) through the inductor (600) to ground.

FIG. 15b shows phase 2 of the charging mode where switch S1 is opened and switch S2 is closed so that the current flows through the inductor (600) from the ground to the capacitor (400) connected to the connection module (260) of the DC-DC converter (200) back to ground. In phase 3 both switches S1 and S2 are opened, and the switch (S1-S2) configuration reverts to what is shown in FIG. 14.

Figures 15C, 15D:
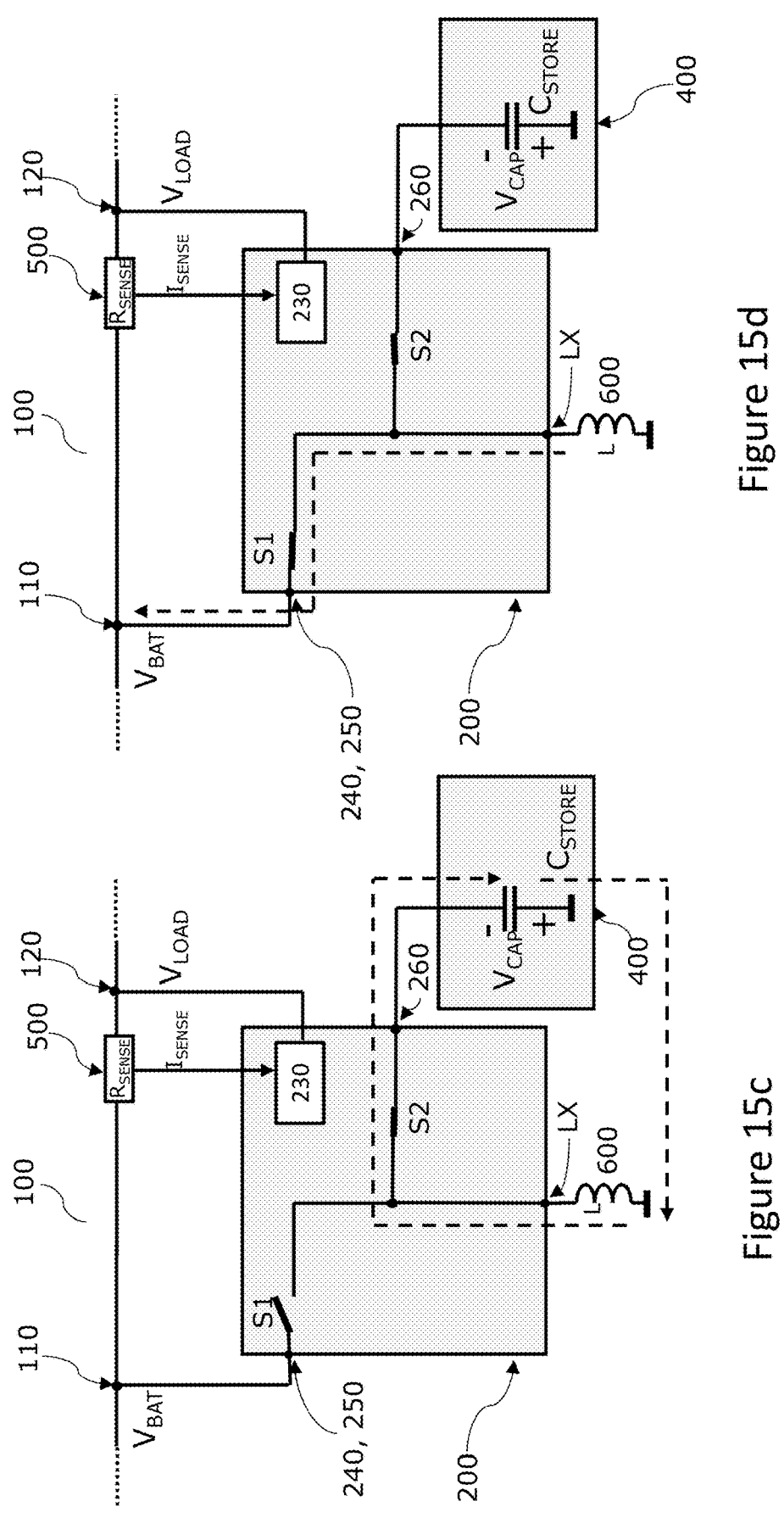

FIG. 15c shows phase 1 of the discharging mode where switch S2 is closed and the current travels from ground through the inductor (600) to the capacitor (400) back to ground.

FIG. 15d shows phase 2 of the discharging mode where switch S2 is opened and switch S1 is closed so that the current flows from ground through the inductor (600) to the load through the output module (250) of the DC-DC converter (200) which is also the input module (240).

In this embodiment, the charging and discharging of current is both performed on the connection at $V_{BAT}$ (110). This means that the output current flows through current sensor module $R_{SENSE}$ (500). The voltage across the current sensor module (500) $R_{SENSE}$ is therefore not zero during the discharge mode. The advantage is the current sensor module (500) $R_{SENSE}$ can now also be used to detect when the current goes below $I_{STOP}$. In phase 3 all switches are opened, and the switch (S1-S2) configuration reverts to what is shown in FIG. 14.

As in Variation 2, the ground connection of the inductor (600) through the DC-DC converter (200) through connection port LX can be made for easy implementation of current sense circuits referenced to.

Figure 16:
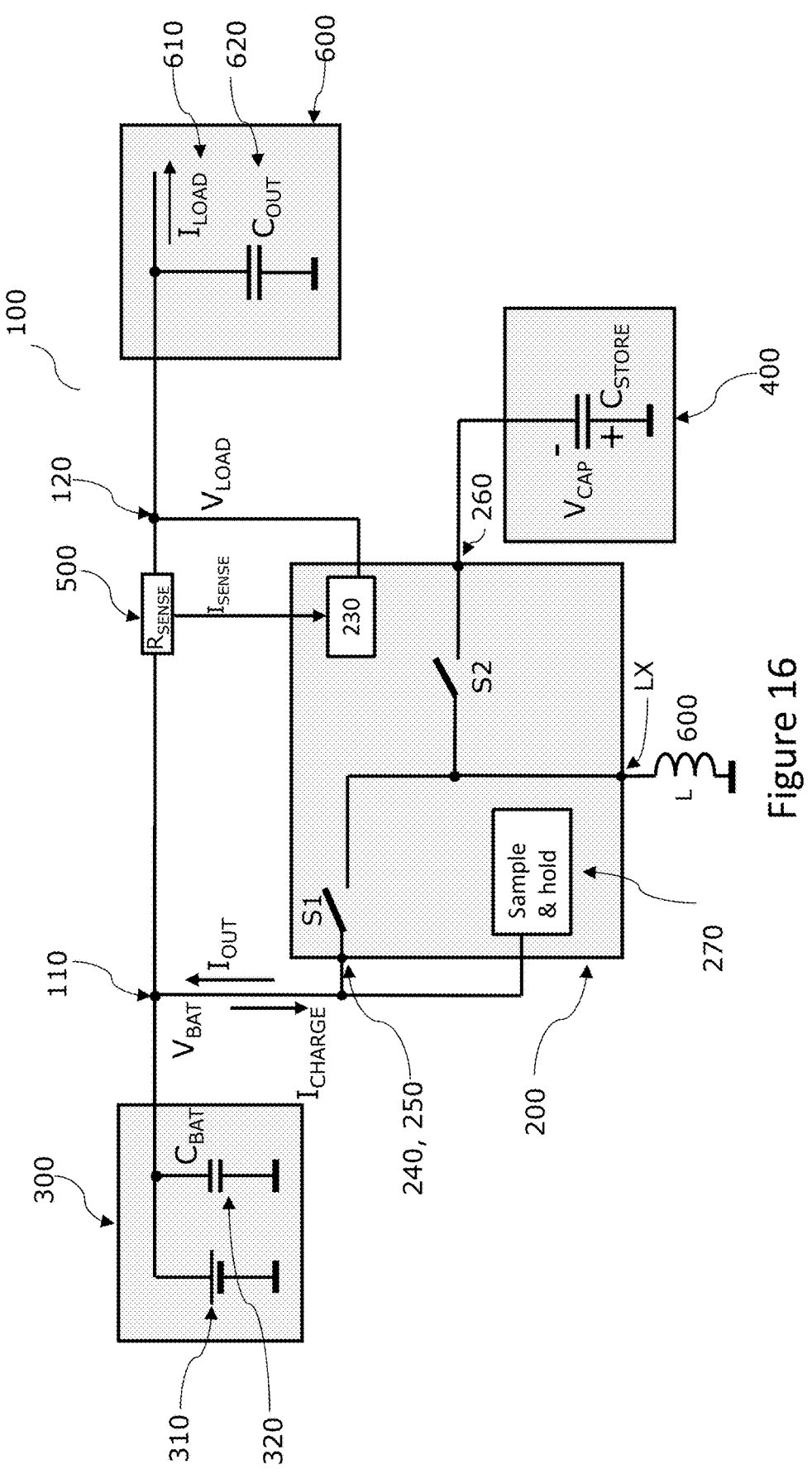
FIG. 16 shows a circuit for autonomous battery lifespan boosting according to another embodiment of the present disclosure.

In order to prevent the battery (310) from delivering a current during discharging mode in this embodiment, the DC-DC converter (200) may further comprise a sample and hold module (270), as shown in FIG. 16, configured to store a reference battery voltage, $V_{BAT,S\&H}$, as a threshold value. During the charging mode (during low load currents), the sample and hold module (270) is configured to store said reference battery voltage value which is used during the discharging mode to regulate the sampled battery voltage $V_{BAT}$, such that all output current is provided by the capacitor (400) through the buffer module and preventing the battery (310) (or power source 300) from delivering any current. The voltage at the load is different than the sampled battery voltage because of the voltage drop across the current sensor module (500) ($R_{SENSE}$). The current sensor module (500) $R_{SENSE}$ being much lower than the internal resistance of the battery (310) does not degrade the overall performance of the circuit.

Variation 4: Full Implementation

Figure 17:
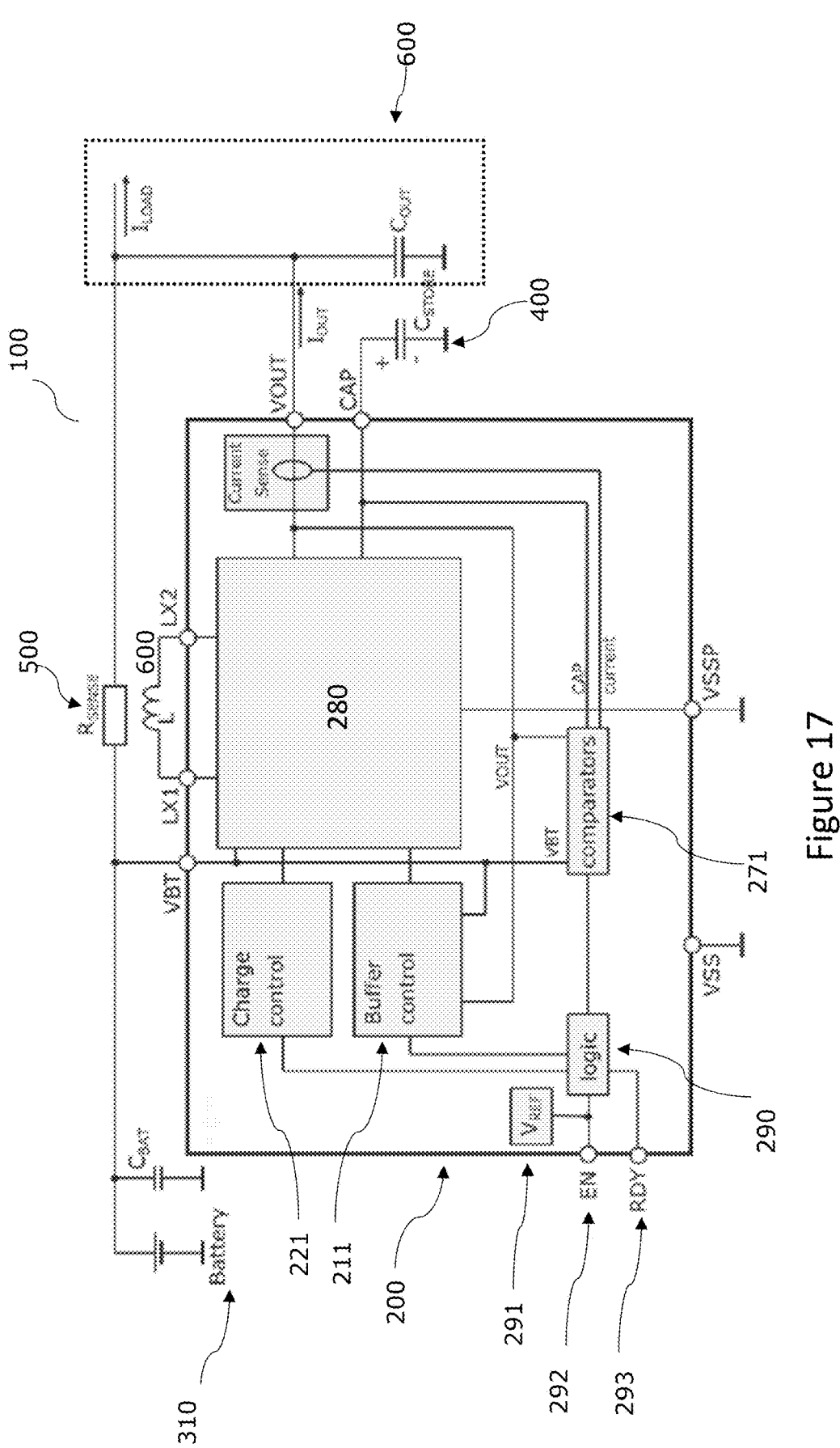
FIG. 17 shows a full implementation of a circuit for autonomous battery lifespan boosting according to another embodiment of the present disclosure.

A complete system of a full implementation of the circuit into an autonomous battery booster is shown in FIG. 17. Similar to other embodiments, the circuit (100) comprises a battery (310), an output (200), a DC-DC converter (200), a current sensing module (500) (here depicted as a resistor $R_{SENSE}$), an inductor L (600) connected to the DC-DC converter (200) at two connection points (LX1, LX2), and a capacitor (400), similar to the disclosures made above. The module with reference number 280 refers a compartment of the DC-DC converter (200) which houses the switches which are operate, in combination with the inductor L (600), as the charging module during charging mode (based on the inputs from the charge control module 221) and discharging mode (based on the inputs from the buffer control module 211). The DC-DC converter (200) may also comprise a comparator (271) which may function similar to a sample and hold module (270)

Figures 18, 19:
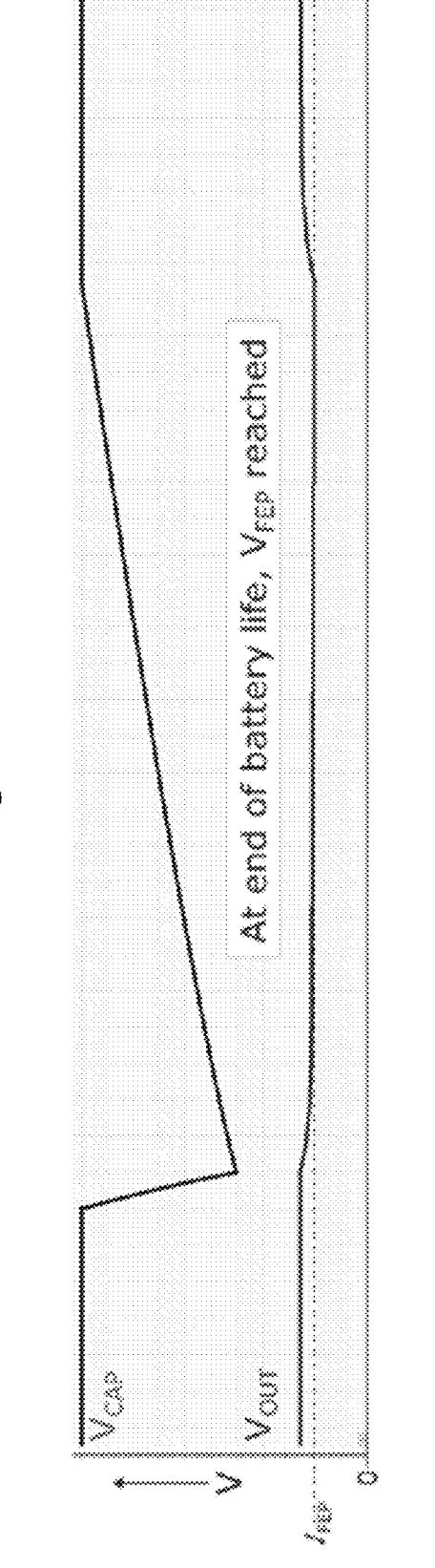
FIG. 18 shows the voltage at a storage cap (V$_{CAP}$), output voltage at load (V$_{OUT}$) and voltage at the functional end point (V$_{FEP}$) over time during a load pulse for a new battery with low series resistance.
FIG. 19 shows the voltage at a storage cap (V$_{CAP}$), output voltage at load (V$_{OUT}$) and voltage at the functional end point (V$_{FEP}$) over time during a load pulse for a battery at end of life with high series resistance.

Furthermore, the circuit (100) comprises a reference circuit VREF (291) which provides voltage and current references, as well as a logic block (290) which controls all functions (like a controller) using comparator signals. A logic signal on the EN pin (292) is used to switch the whole circuit on and off. Since the load is always connected to the battery (310) through $R_{SENSE}$ (500), everything can be switched off when no high load is expected. The logic signal on the RDY pin (293) indicates when the capacitor is fully charged to $V_{CAP,MAX}$. This is shown in FIG. 18 for pulsed load current and a new battery with relatively high voltage and low internal resistance. The changes in $V_{CAP}$ occurs at an identical stage as that described in FIG. 9. Once a pulsed load $I_{LOAD}$ occurs when the capacitor (400) is fully charged (as indicated by the RDY pin (293) signal), the capacitor voltage decreases to a level close to the output voltage $V_{OUT}$. The buffer signal indicates that the DC-DC converter (200) is performing at a discharge mode. Afterwards, the voltage of the capacitor (400) increases (as it is being charged) by the battery (310) with a current $I_{BAT}$, and the charge signal indicates that the DC-DC converter (200) is in a charge mode. FIG. 19 shows the values of the voltages for a battery (310) nearing the end of its life, where $V_{OUT}$ has dropped to a functional end point (FEP) voltage, $V_{FEP}$ of the voltage across the load.

When utilizing the circuit of the present disclosure, the total amount of charge required by the load current pulses is perfectly distributed over time using the predefined battery current level. This charge current level will determine the time needed to re-charge the capacitor. The output voltage remains close to the unloaded sampled battery voltage level during the load pulses. Only during the charging mode, the charge current multiplied by the internal battery resistance will give some reduction in the voltage.

The measurement of the battery (or power source) current can be cone in different ways. The use of the resistance $R_{SENSE}$ is just one way that was chosen to exemplify this method. To match the load to the battery, the capacitor size and maximum capacitor voltage must be chosen such that it contains sufficient energy to provide the load pulses. The charge current level must be chosen such that it is able to re-charge the capacitor between load pulses. During incorrect operation, wrong choices of component values or too high load currents would degrade the overall system performance to the performance of a conventional decoupling system. If the capacitor is chosen too small or the load current peak appears to be too high or long, the capacitor voltage will drop below a minimum value and will then be automatically recharged. As a result, the remainder of the load current pulse will have to be delivered by the battery and the decoupling capacitors $C_{BAT}$ and $C_{OUT}$. If the charge current is chosen too low, the circuit will not be able to fully recharge the storage capacitor, and the minimum capacitor voltage will also be reached. Even if the battery voltage drops below the minimum supply voltage of the circuit, the circuit will shut down, but the battery will still be connected to the load so that the shutdown of the circuit does not result in ending the lifetime of the application.

Figure 20:
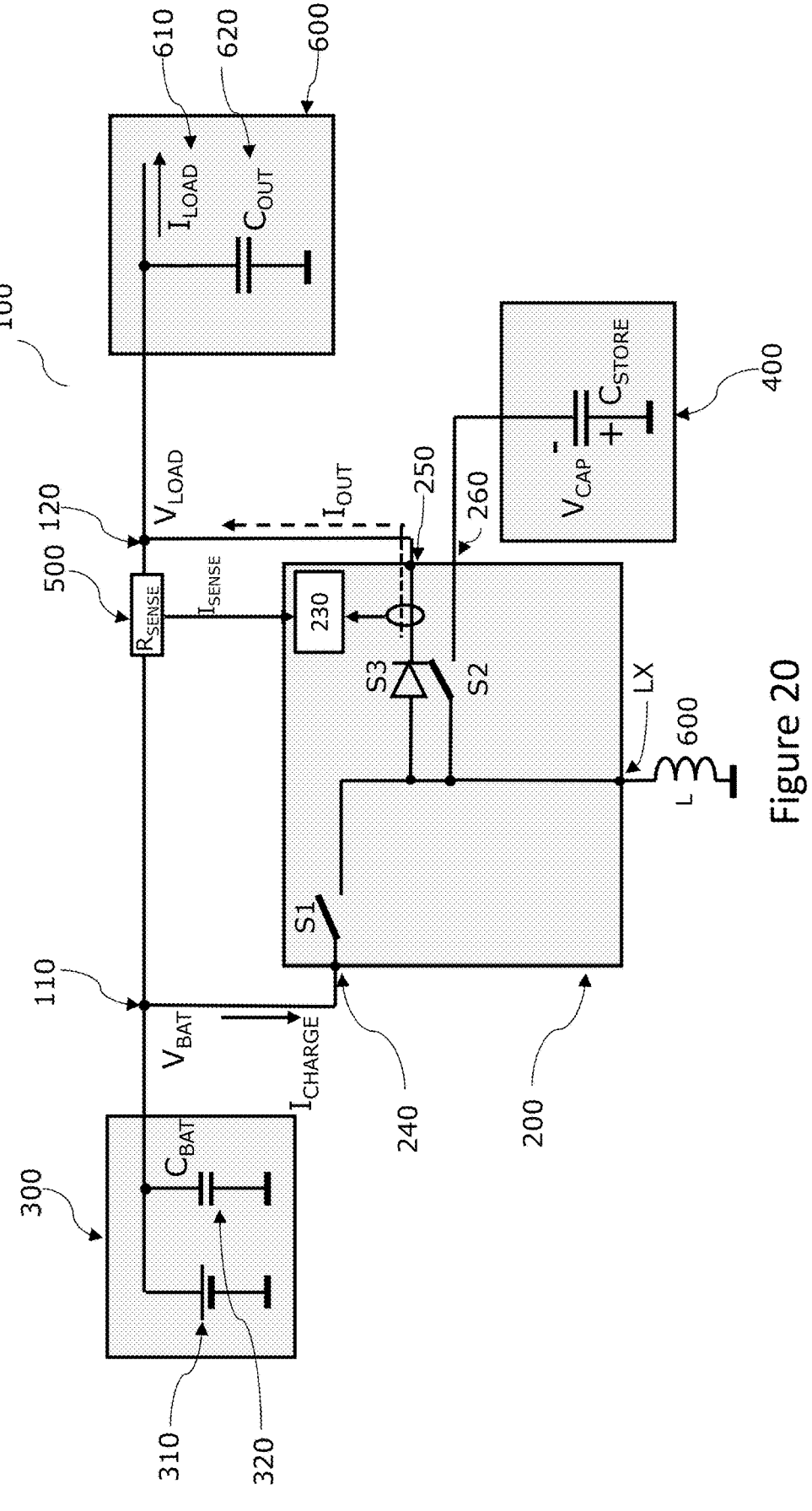
FIG. 20 shows a circuit for autonomous battery lifespan boosting according to another embodiment of the present disclosure.
Figure 21:
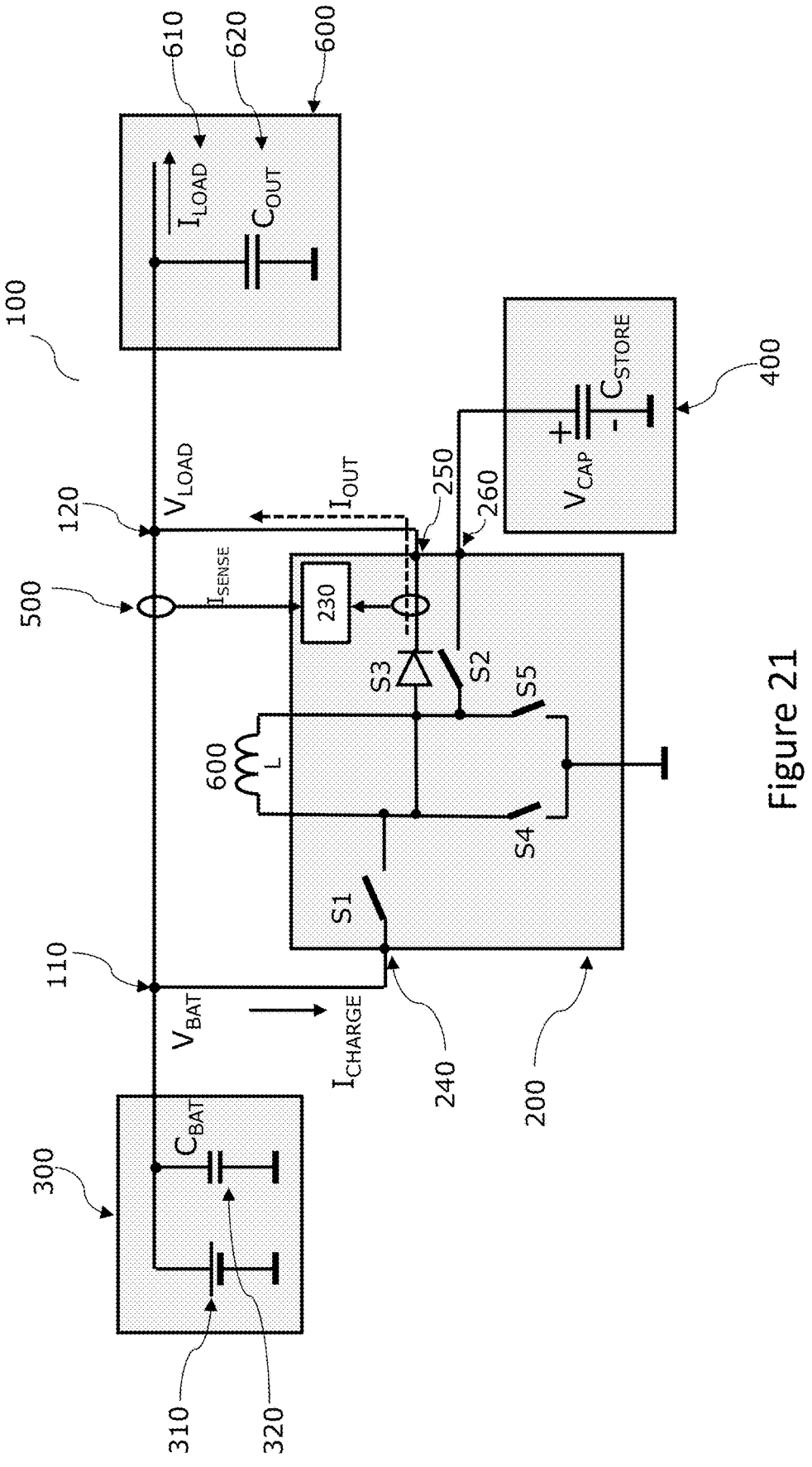
FIG. 21 shows a circuit for autonomous battery lifespan boosting according to another embodiment of the present disclosure.

While the above only mentions switches, it is well known in the art that the functions performed by the switches in the DC-DC converter could easily be performed by semiconductor diodes, as well as field-effect transistors (FETs), such as metal-oxide-semiconductor FETs (MOSFETs) and the like. These semiconductor diodes function in the same way as switches in the circuit (100) described in the above embodiments. For example, FIGS. 20 and 21 depict the circuitry of FIGS. 12 and 10, respectively, wherein the switch S3 replaced by a diode orientated such that the cathode of said diode is directed towards the output module (250).

The scope of the present disclosure includes any novel feature or combination of features disclosed therein either explicitly or implicitly or any generalization thereof irrespective of whether or not it relates to the claimed disclosure or mitigate against any or all of the problems addressed by the present disclosure. The applicant hereby gives notice that new claims may be formulated to such features during prosecution of this application or of any such further application derived therefrom.

In particular, with reference to the appended claims, features from dependent claims may be combined with those of the independent claims and features from respective independent claims may be combined in any appropriate manner and not merely in specific combinations enumerated in the claims.

Features which are described in the context of separate embodiments may also be provided in combination in a single embodiment. Conversely, various features which are, for brevity, described in the context of a single embodiment, may also be provided separately or in any suitable sub combination.

The term "comprising" does not exclude other elements or steps, the term "a" or "an" does not exclude a plurality. Reference signs in the claims shall not be construed as limiting the scope of the claims.

The invention claimed is:

1. A circuit for autonomous battery lifespan boosting, the circuit comprising:

a power source;

an output electrically connected to the power source, the electrical connection forming an electrical load path;

a current sensing module located on the electrical load path between the power source and the output;

a direct current to direct current (DC-DC) converter positioned in parallel to the current sensing module and the electrical load path and electrically connected to the electrical load path at both ends of the current sensing module; and a capacitor electronically connected to the DC-DC converter, wherein the DC-DC converter comprises:

an input module electrically connected to the electrical load path between the power source and the current sensing module, and configured to receive charge from the power source, an output module electrically connected to the electrical load path between the current sensing module and the output, and configured to transmit charge from the capacitor, a connection module connected to the capacitor, a charge module configured to connect the input module with the connection module, a buffer configured to connect the connection module with the output module, and a controller connected to the charge module, buffer and current sensing module, wherein, in operation, the controller is configured to:

when a current sensed by the current sensing module is below a first threshold, instruct the charge module transfer a first charge from the input module to the connection module to charge the capacitor, and when the current sensed by the current sensing module is above a first threshold, instruct the buffer to transfer a second charge from the capacitor connected to the connection module to the output module to replace the sensed current across the electrical load path until a voltage of the capacitor reaches a threshold value.

2. The circuit according to claim 1, wherein the charge module comprises a first inductor and at least one switch, and wherein the buffer comprises the first inductor and at least one switch.

3. The circuit according to claim 2, wherein the charge module and buffer share at least one switch.

4. The circuit according to claim 1, wherein the DC-DC converter further comprises a sample and hold module configured to store a voltage from the power source.

5. The circuit according to claim 1, wherein the capacitor has positive polarity, where the negative capacitor voltage is positive relative to the ground.

6. The circuit according to claim 1, wherein the capacitor has negative polarity, where capacitor voltage is negative relative to the ground.

7. The circuit according to claim 1, wherein the current sensing module is a resistor.

8. A method of operation of a circuit for autonomous battery lifespan boosting, the method comprising the steps of:

(i) sensing, by a current sensing module, the current on an electrical load path between a power source and an output when the sensed current is below a first threshold value;

(ii) transferring, by a controller of a direct current to direct current (DC-DC) converter, charge from the electrical load path to an input module of the DC-DC converter;

a. transferring, by the controller and a charge module of the DC-DC converter, charge from the input module to a connection module of the DC-DC converter;

b. transferring, by the controller and the charge module, charge to a capacitor connected to the connection module, and;

(iii) when the sensed current is above a first threshold value:

a. transferring, by the controller and a buffer of the DC-DC converter, charge from the capacitor to the connection module of the DC-DC converter until a voltage of the capacitor reaches a threshold value;

b. transferring, by the controller and the buffer, charge from the connection module of the DC-DC converter to the output module of the DC-DC converter; and c. transferring, by the controller, charge at the sensed current level, from the output module to the electrical load path to an output.

9. The method according to claim 8, wherein in steps (ii)(b) and (iii)(b) the transferred charge travels across a first inductor of the DC-DC converter and at least one switch of the DC-DC converter.

10. The method according to claim 9, wherein in steps (ii)(b) and (iii)(b) the transferred charge travels across at least one shared switch.

11. The method according to claim 10, wherein the charge in steps (ii)(b) and (iii)(b) passes through a ground of the DC-DC converter.

12. The method according to claim 9, wherein step (ii)(a) further comprises storing a voltage of the power source in a sample and hold module in the DC-DC converter.

13. The method according to claim 9, wherein the charge in steps (ii)(b) and (iii)(b) passes through a ground of the DC-DC converter.

14. The method according to claim 7, wherein step (ii)(a) further comprises storing a voltage of the power source in a sample and hold module in the DC-DC converter.

15. The method according to claim 14, wherein the current travels across the same inductor and at least one switch in steps (ii)(b) and (iii)(b).

16. The method according to claim 7, wherein the charge in steps (ii)(b) and (iii)(b) passes through a ground of the DC-DC converter.

17. The method according to claim 8, wherein step (ii)(a) further comprises storing a voltage of the power source in a sample and hold module in the DC-DC converter.

18. The method according to claim 8, wherein the charge in steps (ii)(b) and (iii)(b) passes through a ground of the DC-DC converter.

* * * * *